United States Patent [19]

Yammoto et al.

[11] 3,836,756

[45] Sept. 17, 1974

[54] DIGITAL CONTROL SYSTEM

[75] Inventors: Makoto Yammoto, Tokyo; Tomio Fukuda, Tokyo; Masamichi Nakatake, Tokyo; Takeshi Yoshida; Hironobu Katayama, both of Sagamihara, all of Japan

[73] Assignees: Shiba Electric Co., Ltd.; Nippon Hoso Kyokai, both of Tokyo, Japan

[22] Filed: Apr. 5, 1973

[21] Appl. No.: 348,418

[30] Foreign Application Priority Data

| | | |
|---|---|---|
| Apr. 5, 1972 | Japan | 47-33436 |
| June 6, 1972 | Japan | 47-55572 |
| Nov. 25, 1972 | Japan | 47-117708 |

[52] U.S. Cl. .............. 235/150.1, 318/608, 318/600, 318/636, 179/100.2 T, 235/92 FQ, 235/92 PF

[51] Int. Cl. ........................ H04n 5/76, G05b 21/02

[58] Field of Search ................ 318/608; 178/616 P; 179/100.2 T

[56] References Cited

UNITED STATES PATENTS

| | | | |
|---|---|---|---|
| 3,495,152 | 2/1970 | Keiser et al. | 318/314 |
| 3,582,541 | 6/1971 | Hebb | 178/6.6 P |
| 3,683,345 | 8/1972 | Faulkes et al. | 318/608 |

*Primary Examiner*—Eugene G. Botz
*Attorney, Agent, or Firm*—Sughrue, Rothwell, Mion, Zinn & Macpeak

[57] ABSTRACT

A digital control system comprises a digital phase comparator, a digital frequency discriminator, a digital frequency modulator and a digital phase modulator, in said digital phase comparator a phase difference between a reference pulse and a pulse to be controlled being converted into a binary number by quantizing said phase difference with clock pulses having a sufficiently high frequency, said binary number being supplied to said digital frequency modulator consisted of a counter as a set count to produce frequency modulated carrier pulses, in said digital frequency discriminator a frequency difference between said reference pulse and said pulse to be controlled being converted into a binary number by counting said clock pulses, said binary number being supplied to said digital phase moudulator consisted of a counter to produce phase modulated carrier pulses.

30 Claims, 118 Drawing Figures

PATENTED SEP 17 1974

3,836,756

SHEET 02 OF 29

DIGITAL CONTROL SYSTEM

The present invention relates to a control system comprising a phase comparator, a frequency discriminator, a frequency modulator and a phase modulator, said phase comparator producing a phase difference between a reference signal and a signal to be controlled, said phase difference being supplied to said frequency modulator as a modulating signal to produce a frequency modulated carrier signal, said frequency discriminator producing a frequency difference between said reference signal and said signal to be controlled, said frequency difference being supplied to said phase modulator as a modulating signal to produce a phase modulated carrier signal.

In such a control system a control loop comprising the phase comparator and the frequency modulator operates as an integral control loop (hereinafer referred as I control system or I loop) and a control loop comprising the frequency discriminator and the phase modulator serves as a differential control loop (hereinafter referred as D control system or D loop). In many cases there is also provided a proportional control system or loop (hereinafter referred as P control system or P loop), in which the phase difference derived from the phase comparator is supplied to the phase modulator as a modulating signal to produce a phase modulated carrier or the frequency difference produced from the frequency discriminator is supplied to the frequency modulator as a modulating signal to produce a frequency modulated carrier. In general, each of said P, I and D control loops comprises a gain adjusting means.

The control system of a kind mentioned above has been widely used as a servomechanism in a video tape recorder (hereinafter referred as VTR) for magnetically recording a video information on a magnetic tape and reproducing a video information recorded on the magnetic tape.

Nowadays, broadcasting programs by means of VTR take a part over 70 percent of the whole broadcasting programs. Thus, it has been desired to improve the stability of VTR and to dispense with readjustment of VTR in order to perform the broadcasting routine smoothly. In order to satisfy such a requirement, the inventors have been experimenting to improve the stability and reliability of the servomechanism of VTR and succeeded to develop an entirely novel "digital control system" which can fully overcome many disadvantages of known control system of analogue type.

FIG. 1 is a block diagram showing a general construction of a known servo system for controlling a video head drum of VTR. In general, the servo system for such a video head drum is constructed from a phase comparator 1 for detecting a phase difference, a frequency discriminator 2 for detecting a frequency difference, a frequency modulator 3, a phase modulator 4 and gain adjusting means 5, 6 and 7. In the known servo system, all of these components operate in an analogue mode. That is, in the known servo device wherein a speed pulse series relating to rotation speed of a synchronous motor 11 for driving a video head drum 14 must be in phase with a reference pulse series, a pulse series representing the rotation speed of the video head drum 14 is detected by a tachometer head 8 which is arranged near a rotating disc 13 having embedded a pole piece or pieces and is driven by the synchronous motor 11 and the detected pulse series is supplied to a pulse former 9 to produce the speed pulse series. The speed pulse series thus produced is supplied to the phase comparator 1 together with the reference pulse series and also to the frequency discriminator 2. Error voltages produced by the phase comparator 1 and frequency discriminator 2, respectively are stored in memory capacitors for a time period corresponding to a sampling period and then are supplied to the frequency modulator 3 and phase modulator 4, respectively as modulating signals after their gains being adjusted by d.c. amplifiers and variable resistors operating as the gain adjustors 5 and 7. It should be noted that in FIG. 1, the gain adjusting means 5, 6 and 7 are provided for I, P and D controls, respectively. An output from the phase modulator 4 is supplied through a motor driving amplifier 10 to the synchronous motor 11 so as to synchronize the rotation of the video head drum 14 with the reference pulse series.

In the known control system shown in FIG. 1, there are provided P, I and D control loops. However, it is not always necessary to effect all of P, I and D controls, but only I control or I-D control may be carried out, if any.

The known servo system constructed as mentioned above has the following disadvantages;

1. Since a self oscillating frequency of a variable frequency oscillator forming the frequency modulator 3 varies with temperature variation, etc., a phase error due to said frequency variation might occur between the reference pulse series and the speed pulse series to be controlled.

2. In the phase comparator 1 and the frequency discriminator 2 use is made of a sample holding circuit. However, an input impedance of a succeeding stage could not be made sufficiently high, so that the holding operation becomes imperfect, particularly in case of a long sample period.

3. The sample holding circuit is usually followed by a d.c. amplifier having a relatively high input impedance. However, a drift of the operation point of the d.c amplifier due to temperature variation is large.

4. Since use is made of analogue circuits, the gain of various portions are liable to vary.

5. Since large size capacitors arranged in multivibrators forming the oscillators, etc. could not be formed as integrated circuits, it is difficult to construct a servo device of small size.

An object of the present invention is to provide a digital control system in which control signals can be all treated as digital amounts and very simple digital circuit elements such as flip-flops, NAND circuits, etc. can be arranged in such a manner that said instability factors of the known analogue type control system such as oscillator frequency variations, drifts of operation points of amplifiers, gain variations at various portions, imperfection of sampling hold, etc. can be all avoided.

Another object of the present invention is to provide a digital control device of small size and of a high reliability.

Another object of the invention is to provide a digital servo system which is particularly suitable for controlling the rotation of the video head drum of VTR in a stable and reliable manner.

According to the basic concept of the present invention all of operations such as detection of phase difference, detection of frequency difference, gain adjustment, frequency modulation and phase modulation are carried out in a digital mode. That is, according to the digital control system of the present invention, for example, a phase difference is converted into a binary number by quantilizing the phase difference with clock pulses having a frequency sufficiently higher than that of a sampling frequency, said binary number is stored in a register for a time period corresponding to a sampling period, the phase difference information thus stored is treated by binary operations which are necessary for the gain adjustment and is used as a frequency-modulating signal by a special manner without converting digital amounts into analogue amounts.

In the present specification, the digital control system according to the invention will be explained in detail by way of an example in which said digital control system is used to control a rotation speed of the synchronous motor for driving the video head drum of VTR. It should be noted that the digital control system according to the invention may be also used as control systems of any other video information recording and reproducing devices such as an electron beam video recorder (EVR) or control systems of digital controlling devices, numerical controlling devices, etc.

In the digital control system according to the invention, a control deviation is quantilized by clock pulses so as to convert it into a binary number. The binary number (digital error signal) thus obtained is stored in flip-flops for a period corresponding to a sampling period and then the digital error signal is supplied to the modulators with its gain being adjusted by a digital operation (binary operation), but without converting it into an analogue amount. All modulators used in the digital control system according to the present invention are special counters having special circuit constructions. As the frequency modulator use is made of a counter having a frequency division ratio which varies in dependence on the digital error signal and as the phase modulator use is made of a counter acting as a pulse delaying device having a variable delay time. Thus, the digital control system according to the invention wherein control deviations are converted into digital amounts (binary numbers) has the following advantages;

1. It is not necessary to use a d.c. amplifier, a variable frequency oscillator, a large size capacitor, etc.

2. Thus, operation points and gains of various portions do not vary in dependence on variations of a source voltage and ambient temperature.

3. Detection of control deviation and modulation are carried out by means of clock pulses generated from a crystal oscillator having high stability, so that the oscillation frequency is stabilized and the drift is decreased to a great extent.

4. Since digital signals are treated, there is no influence of superimposition of unnecessary signals.

The above advantages result in the control system having high stability and there is no need for readjustment in dependence on variations of ambient circumstances. Moreover use can be made of semiconductor integrated circuits which have been highly developed, so that there is a possibility to decrease the number and kinds of elements to be used. Therefore it may be also expected to provide the control system having improved reliability and of small size.

When compare the known analogue control system and the digital control system according to the invention in their basic operations, the following table 1 may be obtained;

Table 1

| | Digital system | Analogue system |
|---|---|---|
| Oscillator | Crystal oscillator | Self-running oscillator |
| Phase comparison | Measurement of pulse interval | Sampling of trapezoid wave |
| Frequency discrimination | Measurement of pulse interval difference | Comparison of phase with pulse delayed by 1 cycle |
| Frequency modulation | Change of division ratio of frequency divider | Frequency modulation by means of variable frequency oscillator |
| Phase modulation | Change of delay amount | Phase modulation by means of serrasoid |
| Sampling hold | Memory of binary number | Potentional holding by capacitor |
| Gain adjustment | Shift, addition and subtraction | d.c. Amplifier and variable resistor |

The present invention will now be explained in detail with reference to the accompanying drawings in which.

Figure 2:
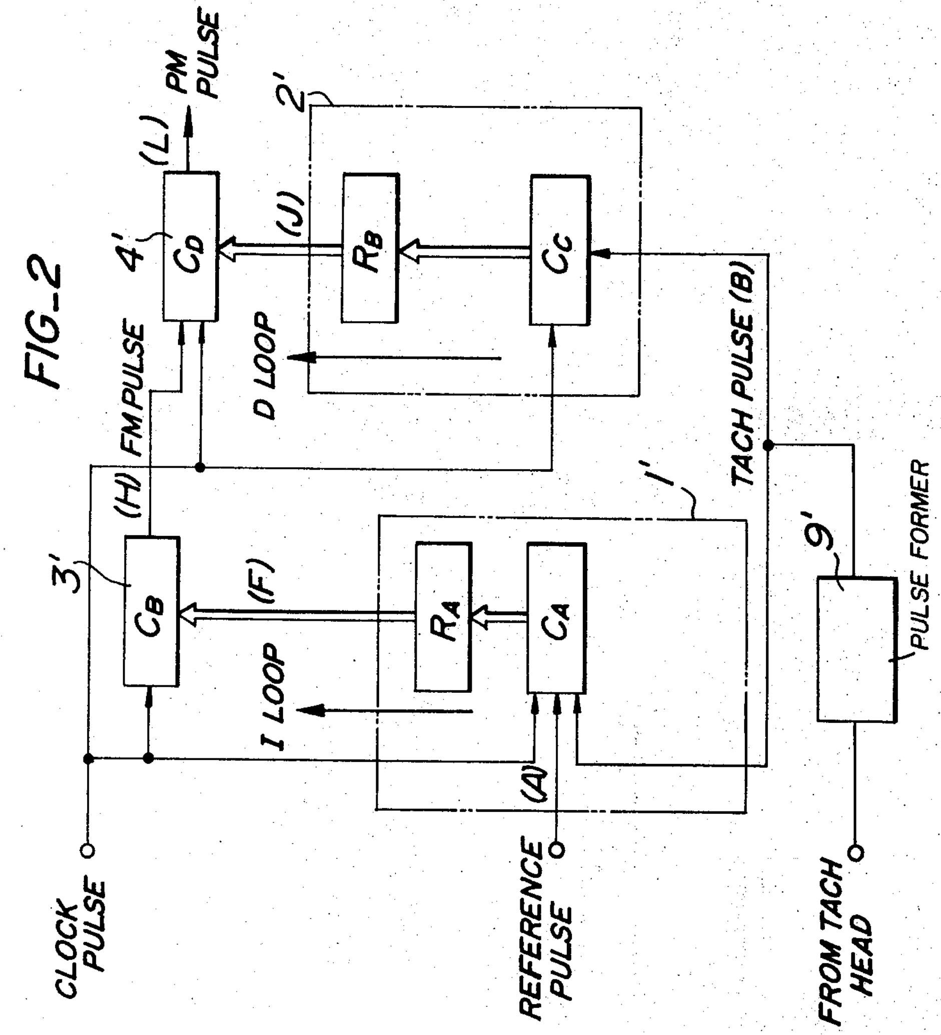
FIG. 2 is a block diagram showing an embodiment of the digital control system according to the invention, in which I-D control can be effected.
Figure 4:
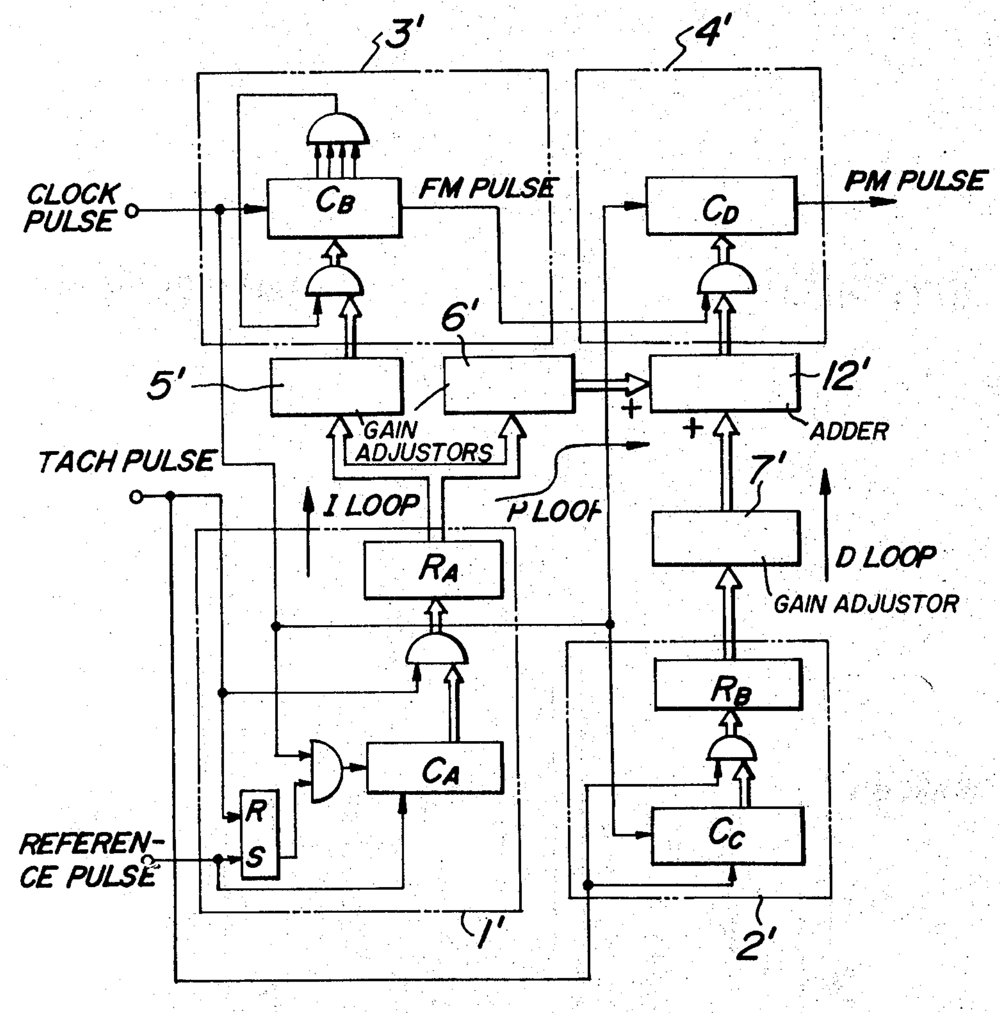
Figure 5:
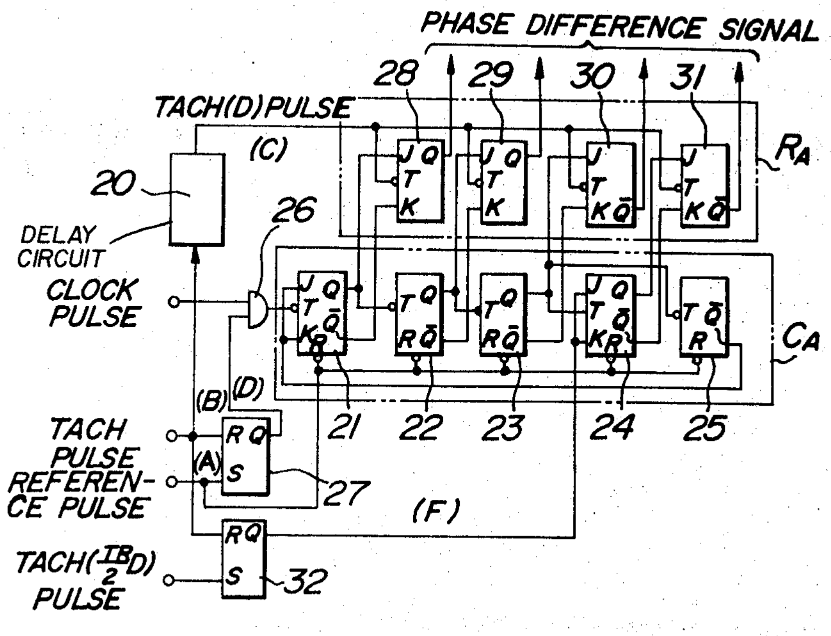
Figure 8:
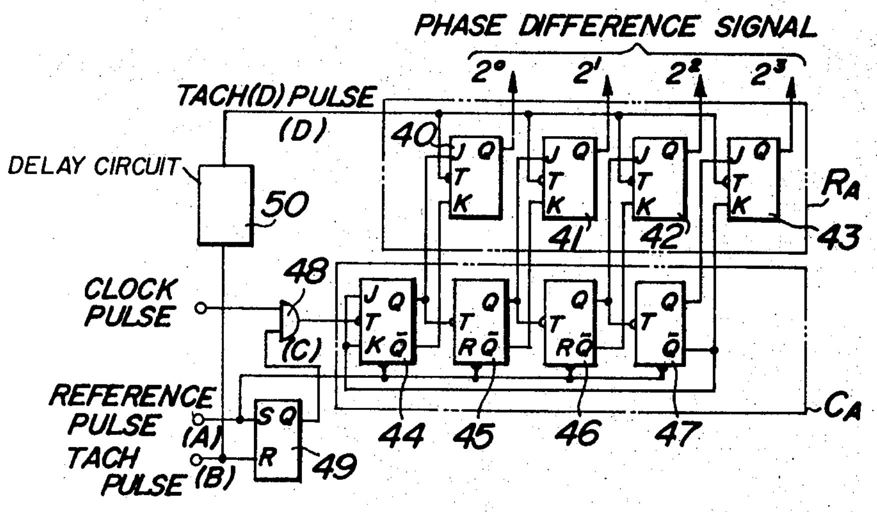
Figure 10:
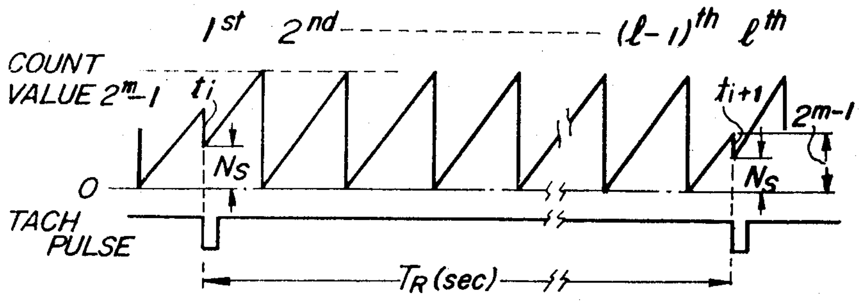
Figure 11:
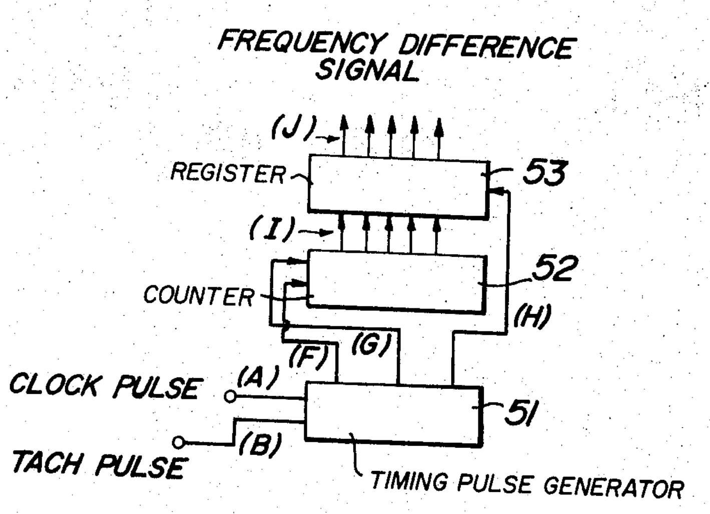
Figure 12:
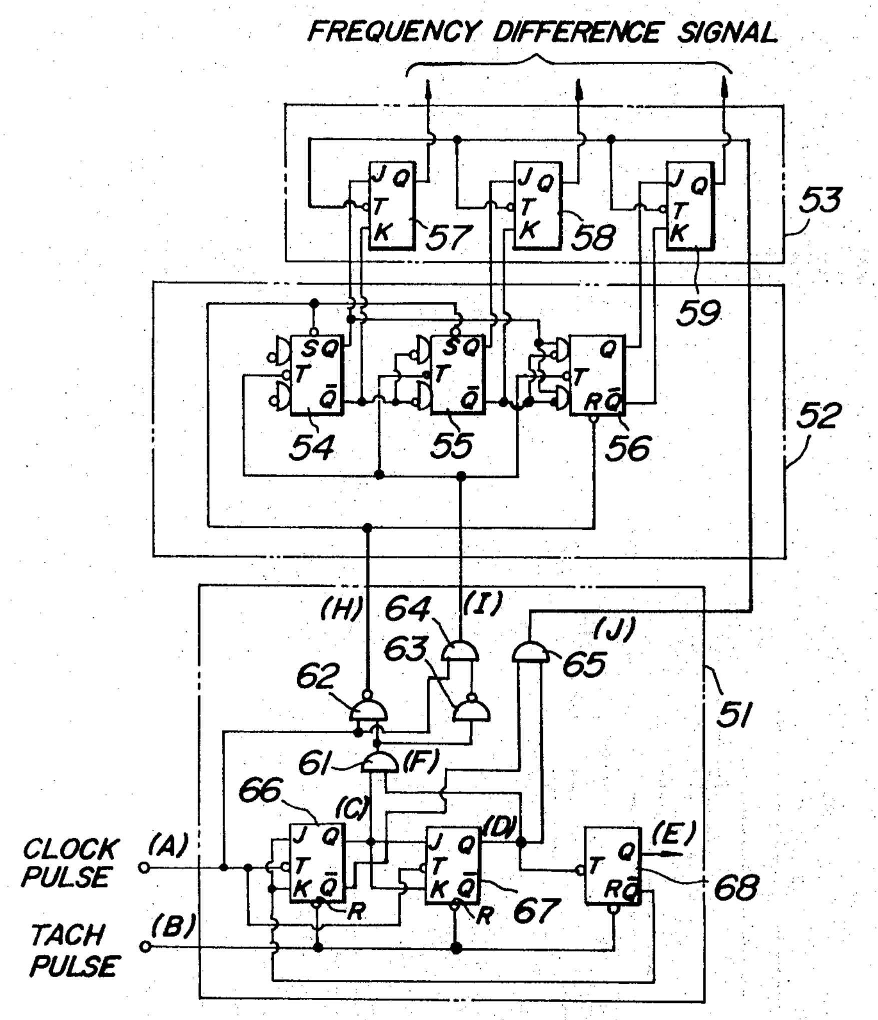
Figure 14:
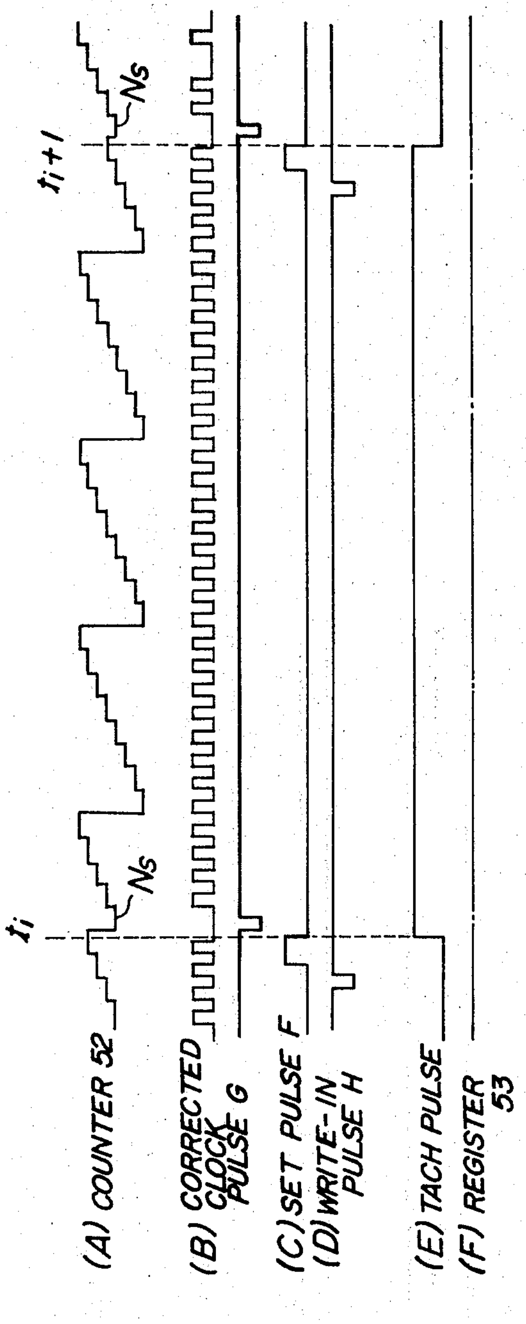
Figure 15:
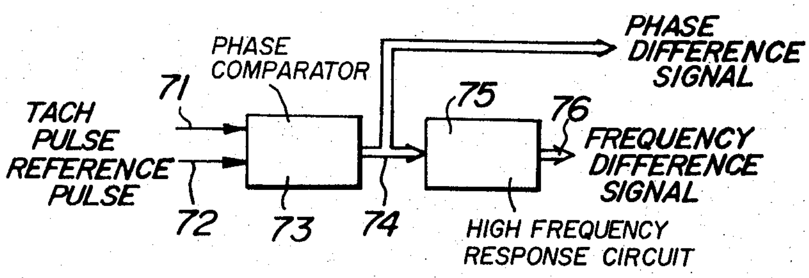
Figure 16:
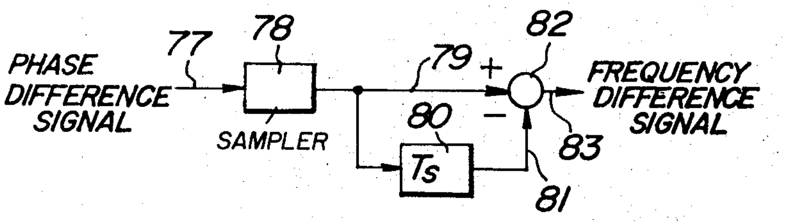
Figure 17:
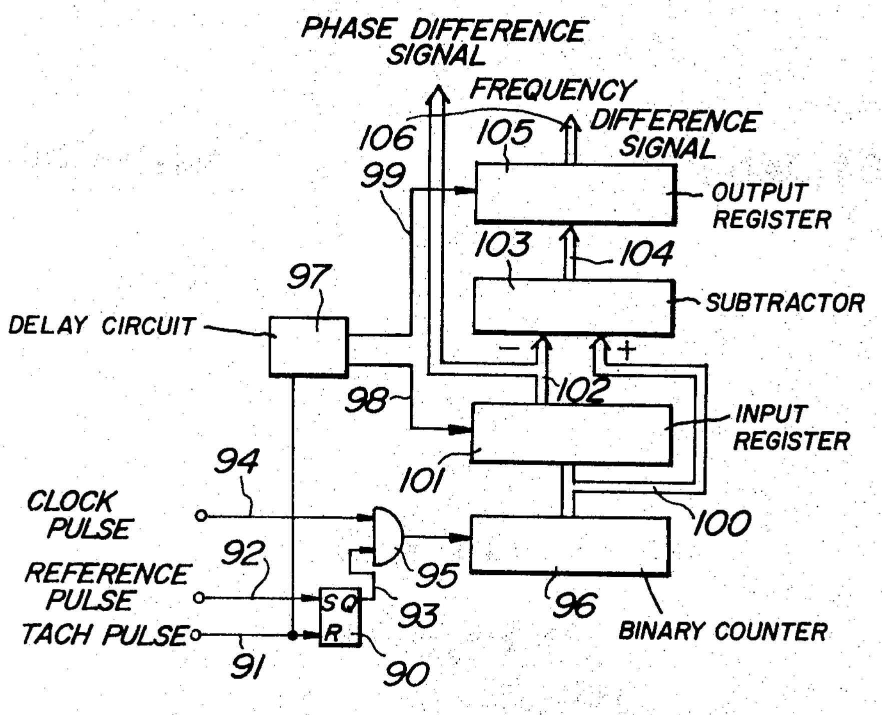
Figure 19:
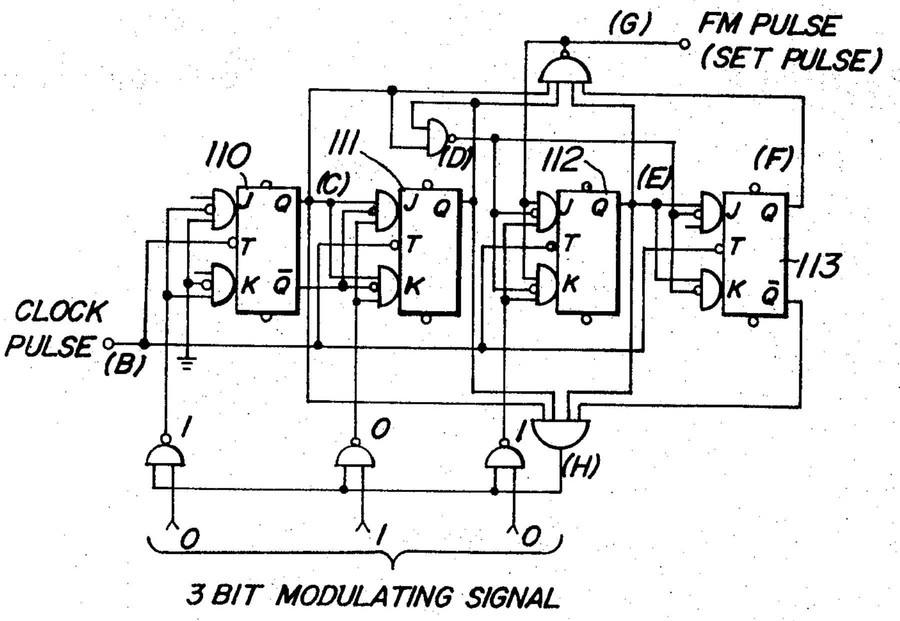
Figure 21:
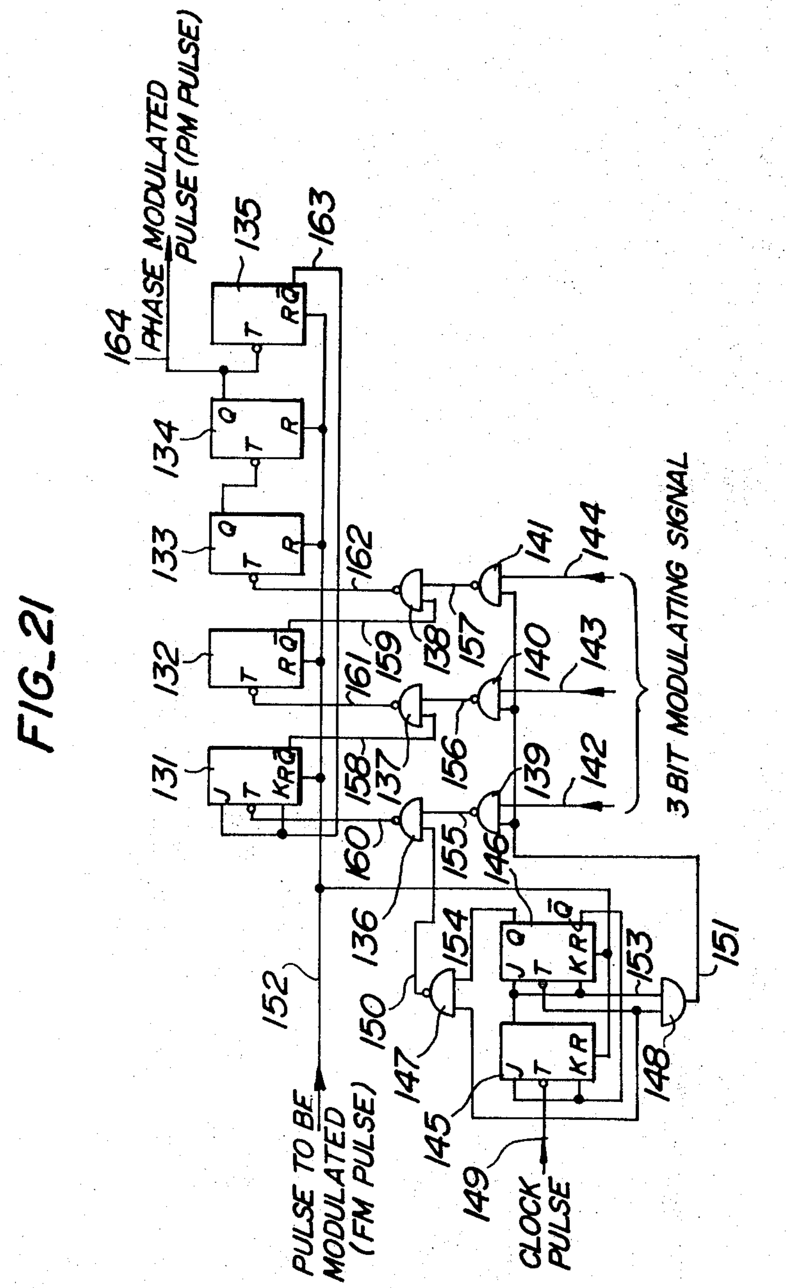
Figure 23:
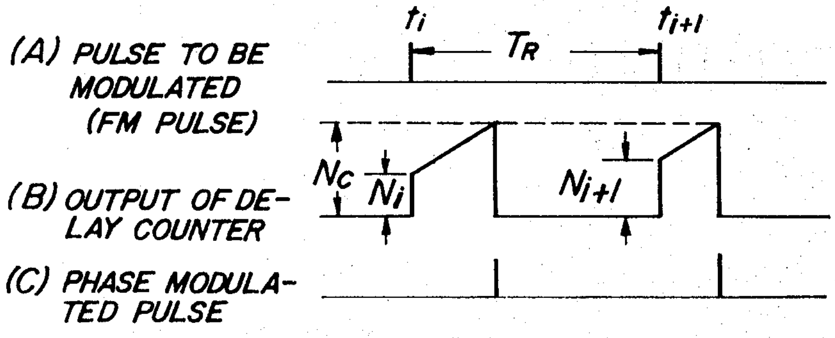
Figure 24:
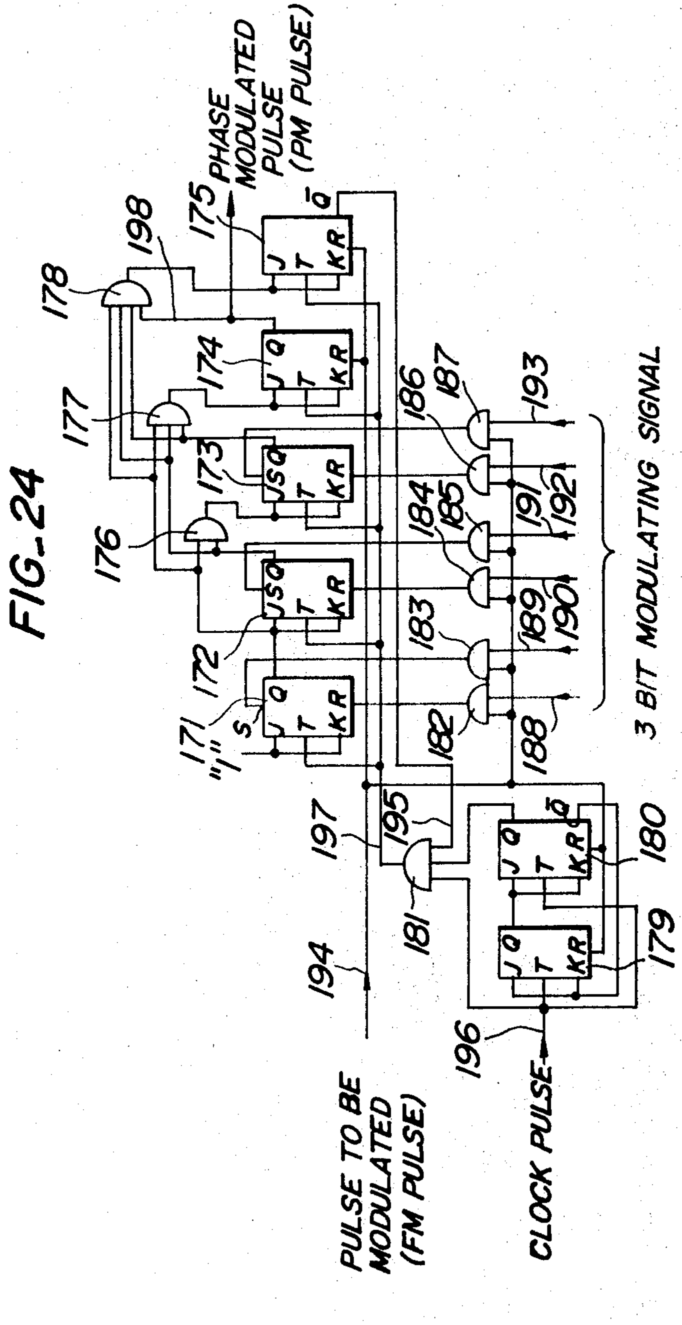
Figure 26:
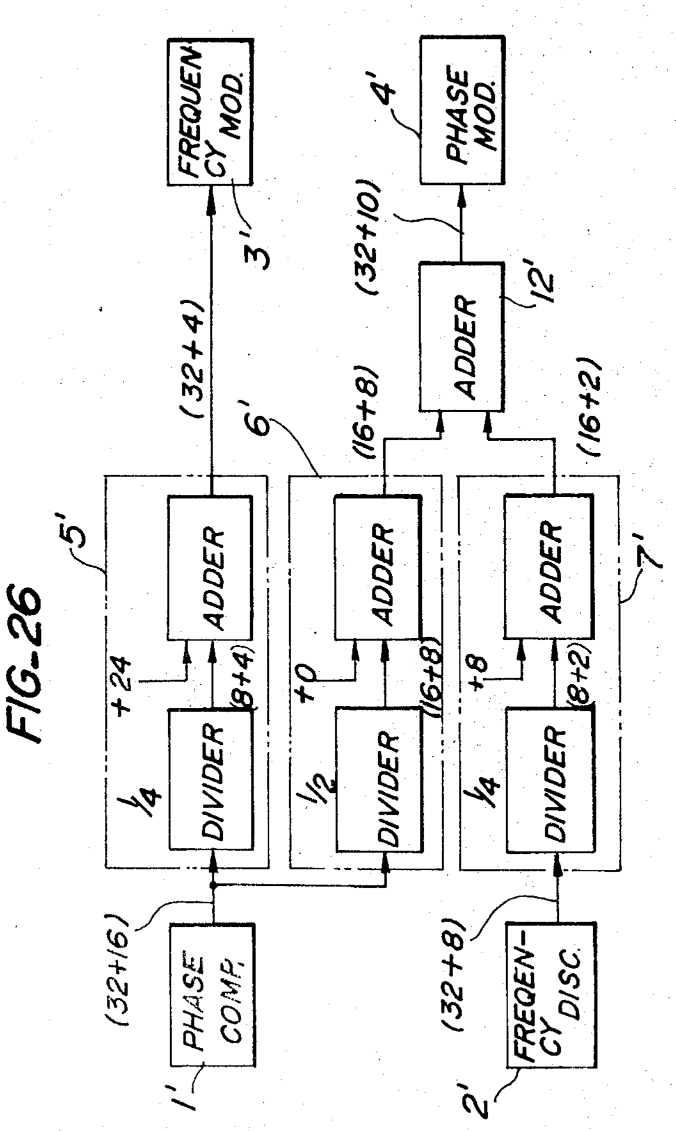
Figure 27:
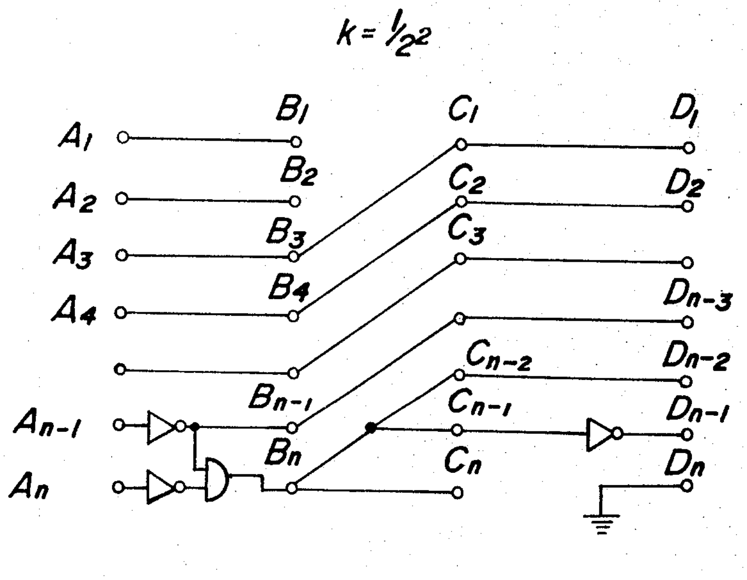
Figure 28:
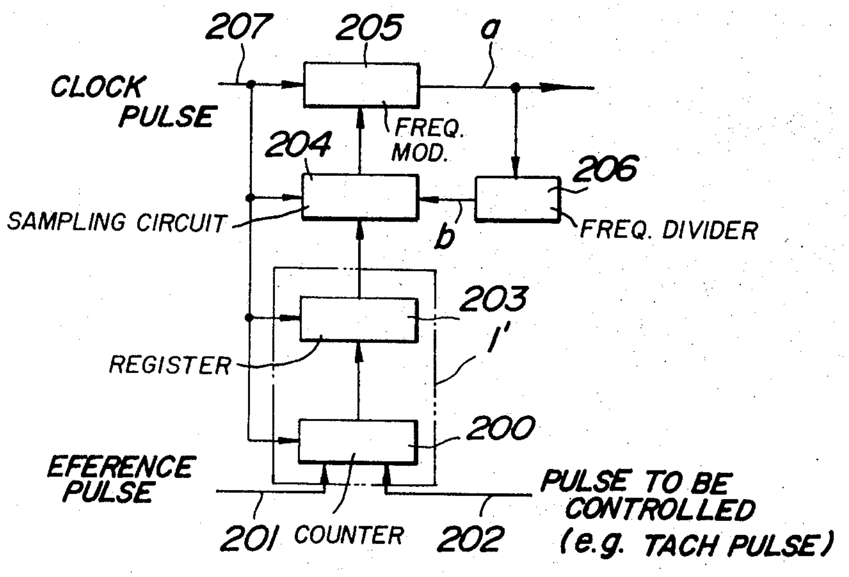
Figure 32:
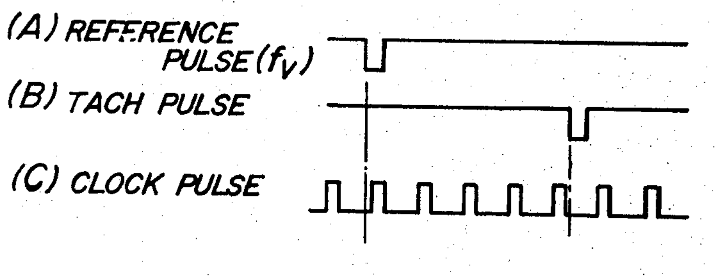
Figure 33:
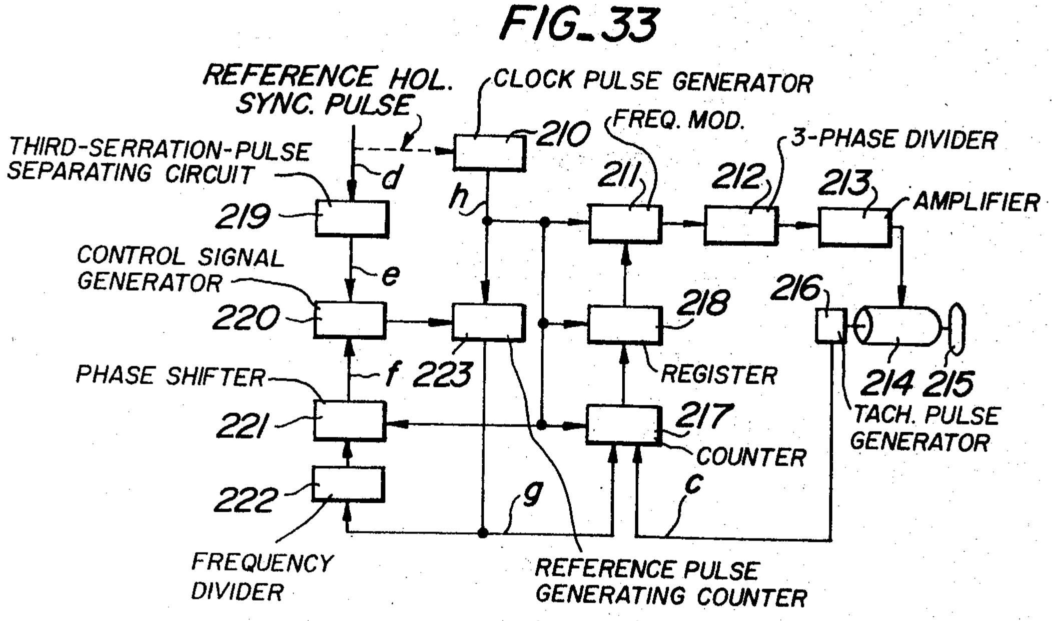

FIGS. 3(A) to (L) illustrate various wave forms appearing at various points of said control system shown in FIG. 2;

FIG. 4 is a block diagram showing an embodiment of the digital control system according to the invention effecting P-I-D control;

FIG. 5 is a logic circuit diagram showing an embodiment of a phase comparator according to the present invention;

FIGS. 6(A) to (G) and FIGS. 7(A) to (G) show various wave forms for explaining an operation of said phase comparator;

FIG. 8 is a logic circuit diagram showing another embodiment of the phase comparator according to the present invention;

FIGS. 9A–9F illustrate various wave forms for explaining the operation of the phase comparator shown in FIG. 8;

FIG. 10 shows wave forms for explaining the basic operation of the frequency discriminator according to the invention;

FIG. 11 is a block diagram showing a basic construction of the frequency discriminator according to the invention;

FIG. 12 is a logic circuit diagram of an embodiment of the frequency discriminator according to the invention;

FIGS. 13A–13H show various wave forms for illustrating the operation of a timing pulse generator of the frequency discriminator shown in FIG. 12;

FIG. 14 illustrates wave forms for explaining a counter and a register of the frequency discriminator shown in FIG. 12;

FIG. 15 is a block diagram showing a basic construction of the phase-frequency discriminator according to the invention;

FIG. 16 is a block diagram illustrating a basic construction of a high frequency response circuit according to the invention;

FIG. 17 is a block diagram showing an embodiment of the phase-frequency discriminator according to the invention;

FIGS. 18(A) to (H) show various wave forms at various points of the phase-frequency discriminator shown in FIG. 17;

FIG. 19 is a logic circuit diagram of an embodiment of the frequency modulator according to the invention;

FIGS. 20(A) to (H) show various wave forms appearing at various points of the frequency modulator;

FIG. 21 is a logic circuit diagram of a phase modulator according to the invention;

FIGS. 22(A) to (F) are various wave forms at various points of the phase modulator shown in FIG. 21;

FIGS. 23(A), (B) and (C) are wave forms for explaining the construction of the phase modulator according to the invention;

FIG. 24 is a logic circuit diagram of another embodiment of said phase modulator;

FIGS. 25(A) to (F) illustrate various wave forms of various points of such a phase modulator;

FIGS. 26 and 27 illustrate a gain adjusting device according to the invention;

FIG. 28 is a block diagram showing an embodiment of an integral loop circuit according to the invention;

FIGS. 29(A), (B), FIGS. 30(A) to (D) and FIGS. 31(A) to (C) show wave forms for explaining the adjustment of loop gain in said integral loop;

FIGS. 32(A) to (C) are wave forms for explaining how to establish a clock pulse frequency according to the invention;

FIG. 33 is a block diagram illustrating an embodiment of an automatic phase adjusting circuit; and FIGS. 34(A) to (C) and FIGS. 35(A) to (E) are wave forms for explaining the operation of said automatic phase adjusting circuit.

Now the construction and operation of an embodiment of the digital control system effecting I-D control for VTR according to the invention shown in FIG. 2 will be explained with reference to wave forms illustrated in FIG. 3. In FIGS. 3(E) (F), (G), (I), (J), and (K), digital count values of counters and registers are shown in the form of analogue magnitudes for the sake of simplicity.

Figure 1:
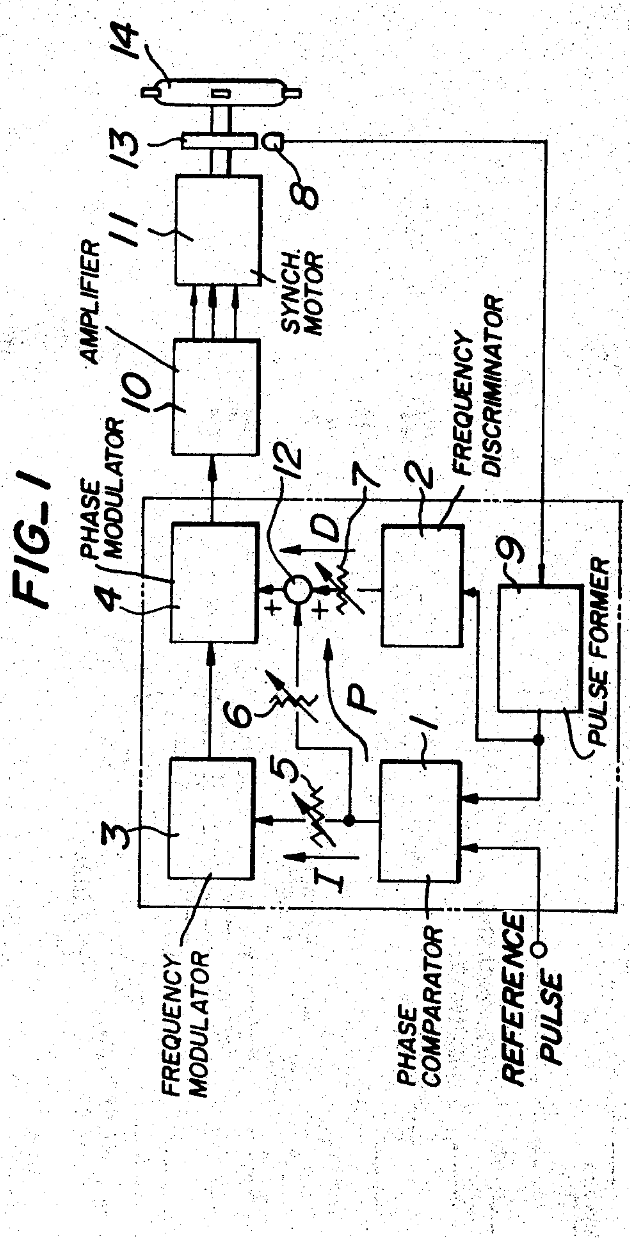
FIG. 1 is a block diagram illustrating a general construction of a known servo system for a video head drum of VTR.

In FIG. 2, several blocks corresponding to the blocks of the known control system shown in FIG. 1 are denoted by the same reference numerals with dashes.

The digital servo system shown in FIG. 2 comprises a phase comparator 1', a frequency discriminator 2', a frequency modulator 3', a phase modulator 4', and a pulse former 9'.

The pulse former 9' receives tachometer pulses from, for example the tachometer head 8 shown in FIG. 1 and produces TACH pulses shown in FIG. 3(B) as pulses to be controlled.

The phase comparator 1' comprises a counter $C_A$ and a register $R_A$. The phase comparator 1' produces a binary number corresponding to a phase difference between the reference pulse shown in FIG. 3(A) and the TACH pulse shown in FIG. 3(B). As will be explained in detail, positive or negative phase difference can be distinguished by suitably establishing a bias count (which has a value corresponding to zero phase difference). The wave forms showing the operation of the phase comparator 1' are illustrated in FIGS. 3(D), (E) and (F). In FIG. 3(E), the bias count is shown by a chain line.

The frequency discriminator 2' comprises a counter $C_C$ and a register $R_B$ and forms a binary number corresponding to a frequency difference between the reference pulse and the TACH pulse. This is effected in the following manner. After a period of the TACH pulses is counted, it is compared with a period of the reference pulses and a difference of these periods is quantilized by the clock pulses so as to obtain a binary number corresponding to said frequency difference. When a bias count (a value corresponding to zero frequency difference) is suitably established, positive and negative frequency differences can be distinguished. The wave forms for explaining the operation of the frequency discriminator 2' are shown in FIGS. 3(I) and (J).

The frequency modulator 3' is constructed by a counter $C_B$. The counter $C_B$ counts clock pulses having a given repetition frequency and is self-reset at each time when the count value reaches a given value. At a suitable timing in the counting operation, the binary number shown in FIG. 3(F) corresponding to the phase difference is transferred from the register $R_A$ to the counter $C_B$. As the results, the counter $C_B$ operating as a frequency divider changes its division ratio to control a repetition frequency of output FM pulses shown in FIG. 3(H).

The phase modulator 4' is constructed by a counter $C_D$ counting the clock pulses. The counting operation is started by said FM pulse from the frequency modulator 3'. At a timing of count start, the binary number shown in FIG. 3(J) is transferred from the register $R_B$ to the counter $C_D$ as an off-set count. When the count value reaches a given value, the counter $C_D$ produces an output pulse and at the same time stops its counting operation and then is reset. As the result, the counter $C_D$ operating as a phase delay circuit changes its delay time in dependence on the binary number to control the phase of output pulses shown in FIG. 3(L).

Figure 3:
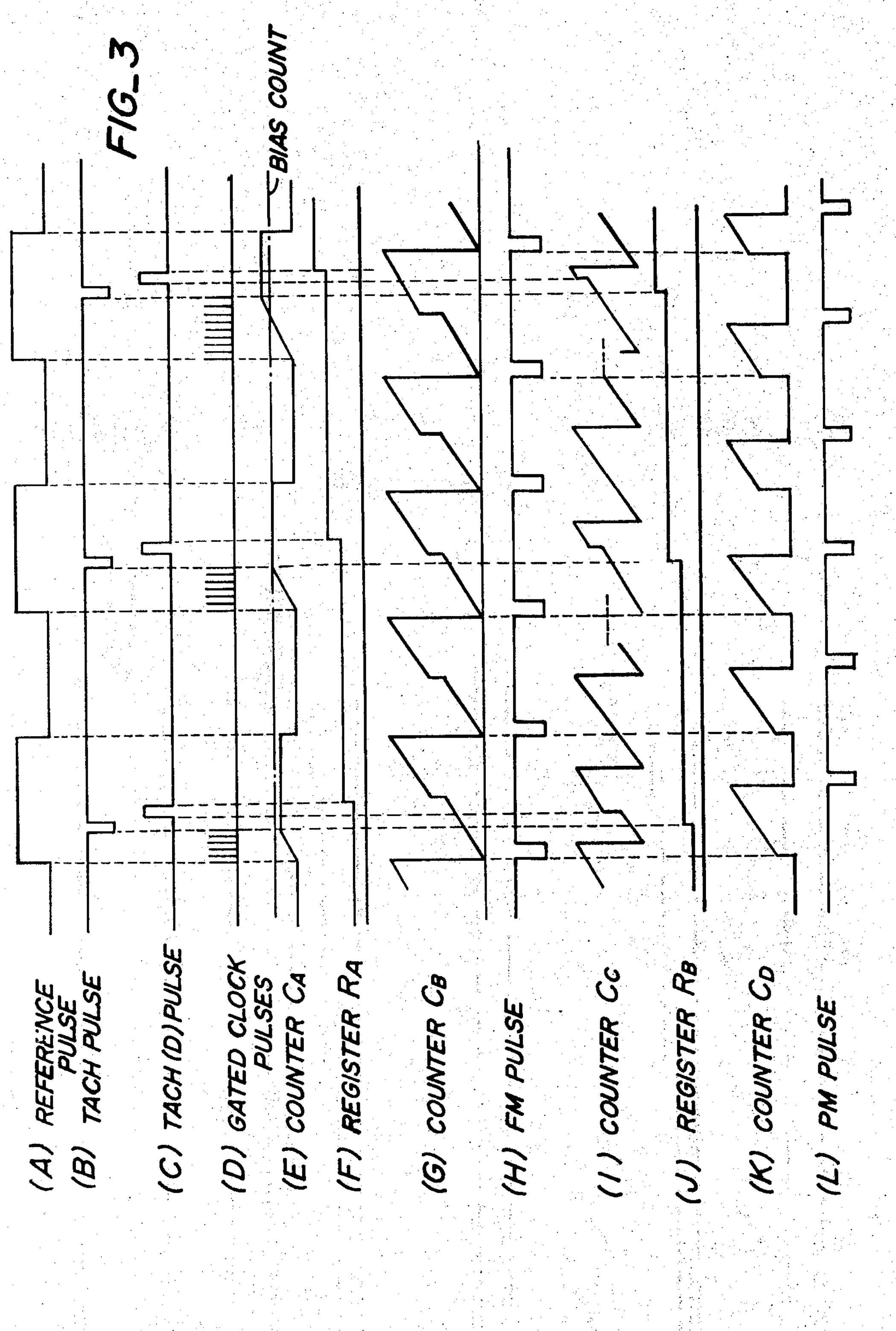

In the integral control loop I comprising the phase comparator 1' and the frequency modulator 3', when, for example the phase of the TACH pulse delays with respect to the reference pulse as shown in FIG. 3, the output binary number shown in FIG. 3(E) from the phase comparator 1' increases beyond the bias count, so that a division ratio of the frequency modulator 3' decreases in dependence on said binary number and therefore the repetition frequency of the output pulses becomes higher as shown in FIG. 3(H). In this manner the phase difference can be decreased. In the differential control loop D comprising the frequency discriminator 2' and the phase modulator 4', when, for example the frequency of the TACH pulses becomes lower than that of the reference pulses, the output binary number shown in FIG. 3(J) from the frequency discriminator 3' becomes larger than the bias count value, so that the delay time in the phase modulator 4' decreases correspondingly so as to decrease the frequency difference.

The registers $R_A$ and $R_B$ in the phase comparator 1' and frequency discriminator 2', respectively store the digital error signals for a sampling period and thus are equivalent to the memory capacitors in the analogue control system.

FIG. 4 shows an embodiment of the digital control system according to the invention which can effect all of P, I and D controls for VTR. In this embodiment there are provided calculators 5', 6' and 7' for adjusting loop gains of I, P and D controls, respectively and an adder 12'.

Next the construction and operation of the components of the digital control system, i.e. the phase comparator 1', the frequency discriminator 2', the frequency modulator 3', the phase modulator 4' and the gain adjustor 5' will be explained in detail. In the embodiments shown in FIGS. 2 and 4, use is made of TACH pulses as pulses to be controlled, but any other pulses such as reproduced synchronizing pulses may be used as pulses to be controlled.

1. Phase Comparator

Figure 6:
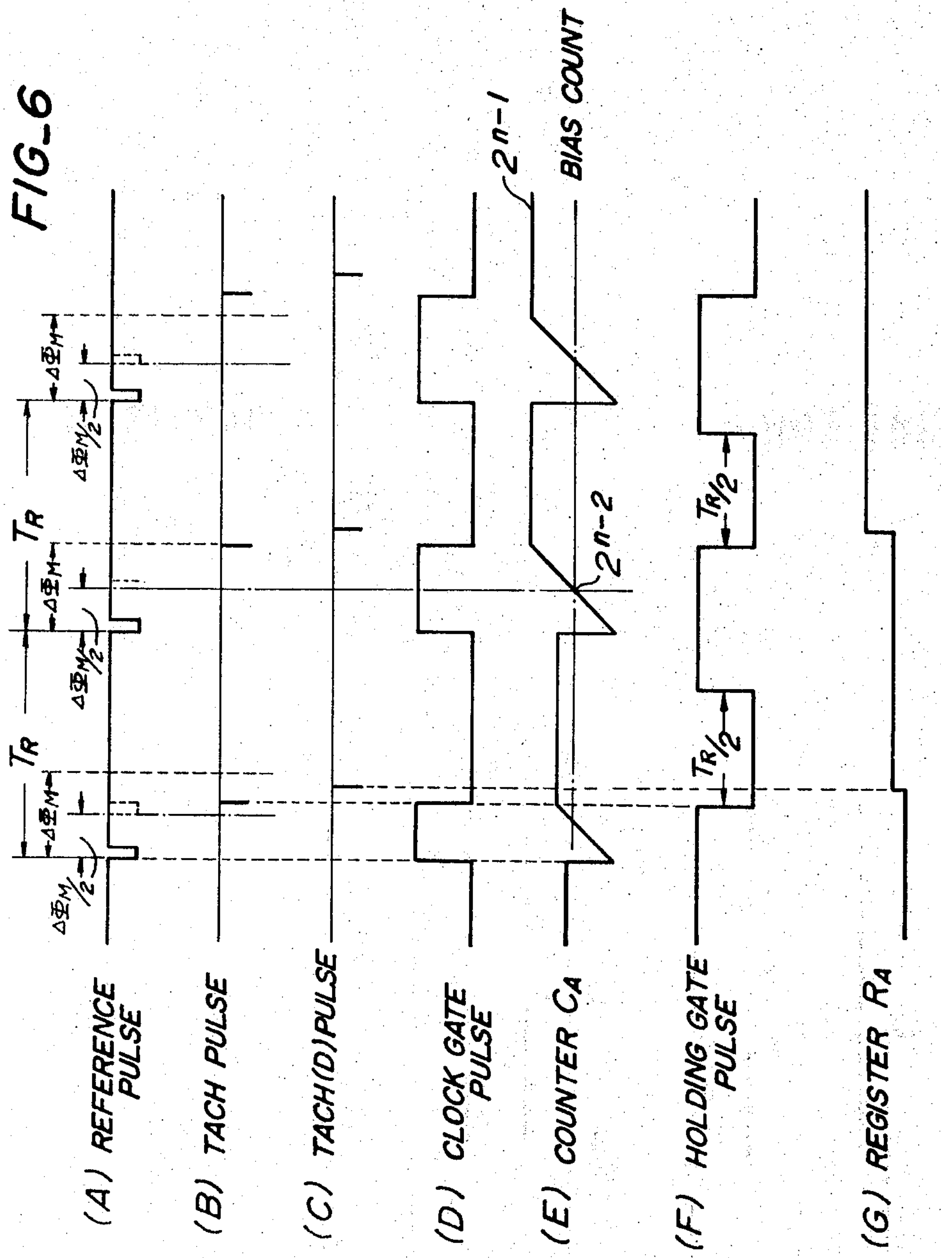
Figure 7:
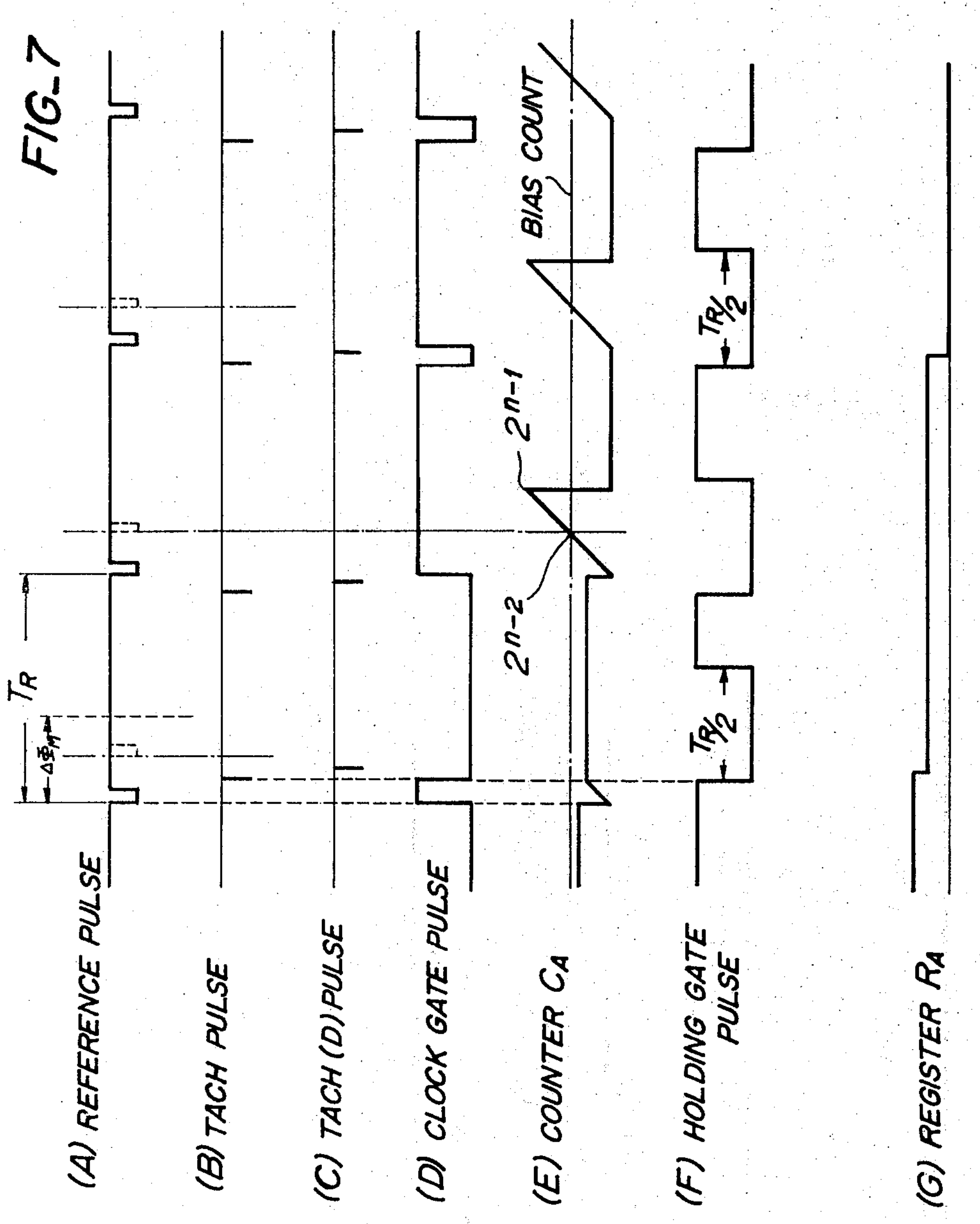

As explained above, the phase comparator 1' according to the invention converts a phase difference between the reference pulse and the TACH pulse into a binary number. A circuit diagram of the phase comparator 1' is shown in FIG. 5 and wave forms for explaining its operation are illustrated in FIGS. 6 and 7. The phase comparator 1' comprises the counter $C_A$ and the register $R_A$. The counter $C_A$ comprises four JK flip-flops 21 to 24 and a JK flip-flop 25 and the register $R_A$ comprises four JK flip-flops 28 to 31. The phase comparator 1' further comprises a clock gate 26 and two RS flip-flops 27 and 32. Q output of the JK flip-flop 23 is connected to T input of the JK flip-flop 25 and $\overline{Q}$ output of the JK flip-flop 25 is connected to J and K inputs of the JK flip-flop 21. To a set terminal of the RS flip-flop 27 is supplied the reference pulses shown in FIG. 6(A) and to a reset terminal is supplied the TACH pulses shown in FIG. 6(B). Q output of the RS flip-flop 27 is connected to one input of the clock gate 26. To the other input of the lock gate 26 is supplied the clock pulses. The TACH pulses are also supplied to a reset terminal of the RS flip-flop 32 and to a set terminal is supplied TACH($^{T}R_D/2$) pulses which may be obtained by delaying the TACH pulses by a time nearly equal to a half of the period of the reference pulses. Q output of the RS flip-flop 32 is connected to J and K inputs of the JK flip-flop 24. The TACH pulses are also supplied to a delay circuit 20 to produce delayed TACH(D) pulses shown in FIG. 6(C). The TACH(D) pulses are supplied to T terminals of JK flip-flops 28 to 31 of the register $R_A$.

Now the operation of the phase comparatoror 1' will be explained with reference to wave forms illustrated in FIG. 6. FIG. 6(A) shows the reference pulse series having a repetition period of $T_R$[sec]. In FIG. 6(A) there are also shown maximum detectable phase differences $\Delta\Phi_M$ and imaginary reference pulses denoted by dotted lines, each of which situates at a middle of the maximum detectable phase difference $\Delta\Phi_M$. In the phase comparator 1' according to the invention, phase differences between the imaginary reference pulses and the TACH pulses shown in FIG. 6(B) are detected. As shown in FIG. 6(B) the left-hand TACH pulse laggs with respect to the imaginary reference pulse by an amount which lies within $\Delta\Phi_M$. The middle TACH pulse also laggs by an amount which is equal to $\Delta\Phi_M$. The right-hand TACH pulse laggs by an amount which lies beyond $\Delta\Phi_M$.

When the reference pulse resets the JK flip-flops 21 to 25 and sets the RS flip-flop 27, Q output of the RS flip-flop 27 enables the clock gate 26. Thus the counter $C_A$ starts to count the clock pulses supplied through the clock gate 26. When the TACH pulse resets the RS flip-flop 27, the clock gate 26 is disabled and the counter $C_A$ stops its counting operation. Thus the counter $C_A$ counts the clock pulses which have passed through the clock gate 26 during a time interval between the reference pulse and the TACH pulse. The count value is held in the JK flip-flops 21 to 24 constituting the counter $C_A$ until a next reference pulse will reset the JK flip-flops 21 to 24. The count value thus held is then transferred to the JK flip-flops 28 to 31 forming the register $R_A$ by means of the TACH(D) pulse.

In the counter $C_A$ shown in FIG. 5, when the counter $C_A$ counts eight clock pulses, the JK flip-flops 21 to 23 change to 0 condition and the JK flip-flops 24 and 25 change to 1 condition. Thus $\overline{Q}$ output of the JK flip-flop 25 changes to 0 and as the results J and K inputs of the JK flip-flop 21 change to 0. Therefore the counter $C_A$ cannot count clock pulses more than eight clock pulses. In FIG. 6, the right-hand TACH pulse and its related wave forms show such a condition.

In general, when the counter $C_A$ consists of n stages, the maximum count value is equal to $2^{n-1}$ which corresponds to the maximum detectable phase difference $\Delta\Phi_M$. The count value corresponding to the imaginary reference pulse becomes $2^{n-2}$ which is equal to the bias count. In this manner lag phase difference of the TACH pulse with respect to the imaginary reference pulse is detected as a count value exceeding the bias count.

FIG. 7 shows wave forms for explaining the operation of the phase comparator 1' in case that the TACH pulses lead with respect to the imaginary reference pulses. The left-hand TACH pulse leads with respect to the imaginary reference pulse by an amount which does not exceed the maximum detectable phase difference $\Delta\Phi_M$. The remaining TACH pulses shown in FIG. 7(B) lead with respect to the imaginary reference pulses by an amount which exceeds $\Delta\Phi_M/2$. As shown in the left-hand side of FIG. 7, when the TACH pulse lies between the reference pulse and the imaginary reference pulse, the counter $C_A$ counts the clock pulses which have passed through the clock gate 26 during a time interval between the reference pulse and the TACH pulse. Thus the count value in this case does not reach the bias count. This count value is transferred to the register $R_A$ by means of the TACH(D) pulse. Whereas, when the TACH pulse leads the reference pulse, the counter $C_A$ counts clock pulses up to $2^{4-1}$. However, the RS flip-flop 32 will be set by the TACH($^{T}R_D/2$) pulse after the counter $C_A$ has counted $2^{4-1}$ clock pulses, so that Q output of the RS flip-flop 32 remains 0. Therefore even when the counter $C_A$ counts $2^{4-1}$ clock pulses, the JK flip-flop 24 does not change to 1 condition and remains 0 condition. But the JK flip-flop 25 changes to 1 condition, so that its $\overline{Q}$ output changes to 0 and the counter $C_A$ stops its counting operation. At this moment all the JK flip-flops 21 to 24 are in 0 condition and thus the count value is zero as shown in FIG. 7(E). This count value of 0 is transferred to the register $R_A$ by means of the TACH(D) pulse.

In general, in the counter $C_A$ consisting of n stages, when the TACH pulse lead with respect to the reference pulse, the count value becomes 0 at a $(2^{n-1})$th clock pulse.

In the manner described above, the phase comparator 1' according to the invention produces a binary number representing a phase difference between a TACH pulse and an imaginary reference pulse with the bias count which corresponds to zero phase difference being as a single stable point. When a TACH pulse laggs beyond the maximum detectable phase difference $\Delta\Phi_M$, the count value is always kept to $2^{n-1}$ and when a TACH pulse leads beyond $\Delta\Phi_M$, the count value becomes always 0. This corresponds to a feature that in an analogue control system use is made of a symmetrical trapezoid wave. By means of such a measure it is possible to reduce a run-in time.

In general, when the counter $C_A$ is consisted of n stages, the maximum count value corresponding to the maximum detectable phase difference $\Delta\Phi_M$ is equal to $2^{n-1}$ and the bias count corresponding to zero phase difference is equal to $2^{n-2}$. If the repetition frequency of the clock pulses is represented by $f_C$[Hz] and the frequency of the reference pulse is denoted by $f_R$[Hz], the detectable phase difference can be expressed as $\pm 2\pi f_R \cdot 2^{n-2}/f_C$[rad] with taking $2^{n-2}$ as the bias count. In other words, said detectable phase difference can be expressed as $\pm 2^{n-2} \cdot T_C$[sec], wherein $T_C$ is a period of the clock pulses.

As described above, in the phase comparator 1' according to the invention, a phase difference between the reference pulse and a pulse to be controlled is measured so as to produce a digital number (binary number) proportional to said phase difference, said binary number is stored for the sampling period and an output is supplied to the frequency modulator 3' as shown in FIG. 2.

FIG. 8 shows another embodiment of the phase comparator 1' according to the invention. In this embodiment, phase differences of the TACH pulses to be controlled with respect to the reference pulses are detected as binary numbers of four bits. The phase comparator of this embodiment comprises a counter $C_A$ consisted of four JK flip-flops 44 to 47, a register $R_A$ constructed by four JK flip-flops 40 to 43, a clock gate 48, an RS flip-flop 49 and a delay circuit 50. $\overline{Q}$ output of the JK flip-flop 47 is connected to J and K inputs of the JK flip-flop 44. Q output of the RS flip-flop 49 is connected to one of inputs of the clock gate 48. To the other input of the clock gate 48 is supplied the clock pulses. The reference pulses are supplied to a set terminal of the RS flip-flop 49 and also to reset terminals of the JK flip-flops 44 to 47 of the counter $C_A$. The TACH pulses are supplied to a reset terminal of the RS flip-flop 49 and also to the delay circuit 50. The delay circuit 50 produces the TACH(D) pulses.

Figure 9:
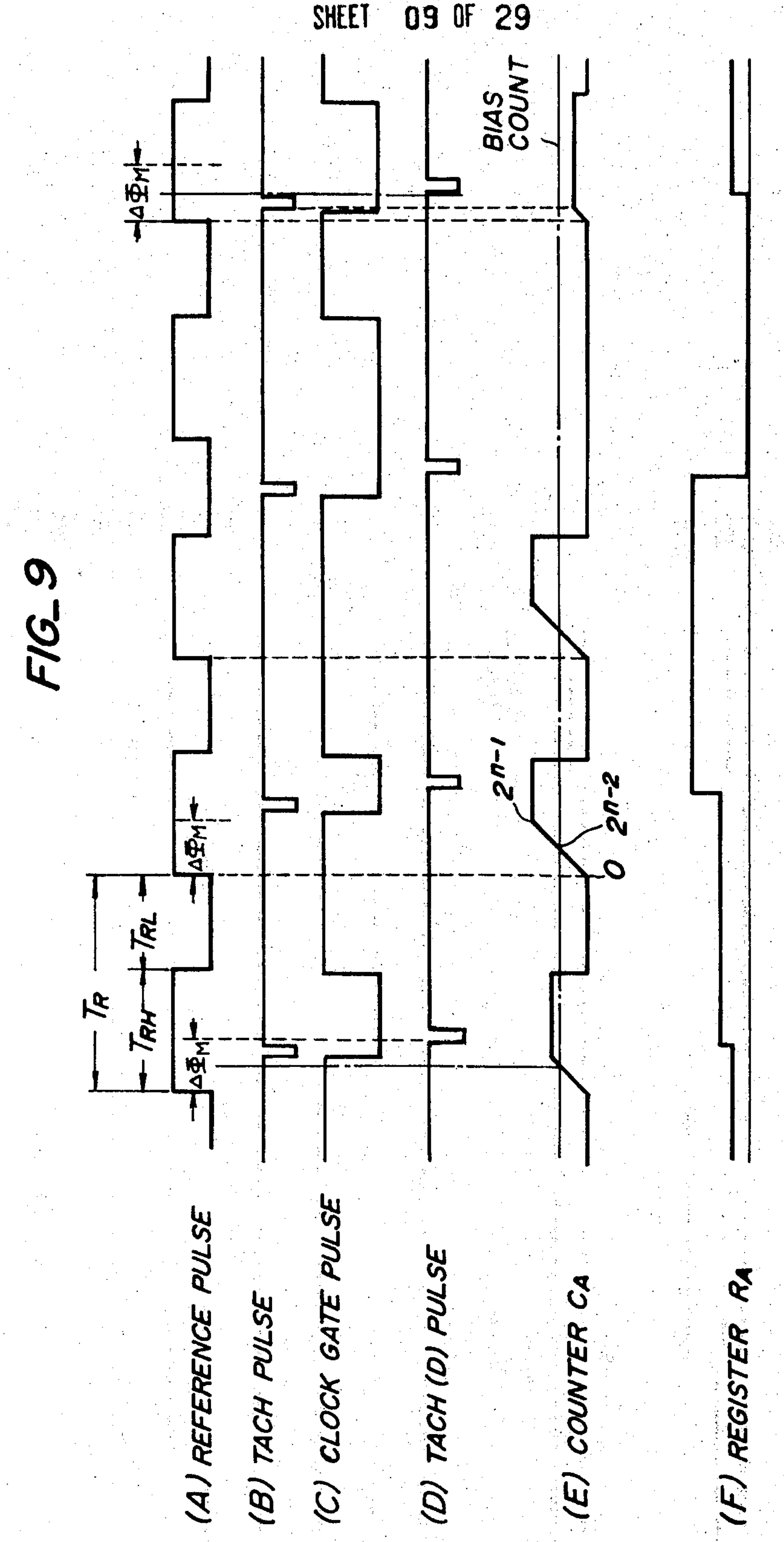

FIG. 9 shows wave forms for explaining the operation of the phase comparator shown in FIG. 8. In the present embodiment the reference pulse has a duty cycle of about 50% as shown in FIG. 9(A). That is, the reference pulse has a high level period $T_{RH}$[sec] and a low level period $T_{RL}$[sec] which satisfy the following equations (1) and (2), respectively;

$$T_{RH} = T_R/2 + T_C \cdot 2^{n-2} \quad (1)$$

$$T_{RL} = T_R/2 - T_C \cdot 2^{n-2} \quad (2)$$

wherein $T_C$ is a period of the clock pulse, $T_R$ is a period of the reference pulse and $2^{n-2}$ is a center count value, i.e. the bias count of the counter $C_A$ of *n* stages.

When the reference pulse is in the low level state 0, it setts the RS flip-flop 49 and thus the clock gate pulse becomes the high level 1 as shown in FIG. 9(C), so that the clock gate 48 is enabled to pass the clock pulses. However, the reference pulse at the low level 0 resetts the JK flip-flops 44 to 47, so that the counter $C_A$ cannot count the clock pulses. When the reference pulse changes its state from the 0 level to the 1 level, the counter $C_A$ starts to count the clock pulses as shown in FIG. 9(E). When the TACH pulse resetts the JK flip-flop 49 and thus the clock gate pulse changes to the low level, the clock gate 48 is disabled and the counter $C_A$ stops to count the clock pulses. In this manner the counter $C_A$ counts the clock pulses which have passed through the clock gate 48 during a time interval between the reference pulse and the TACH pulse which time interval corresponds to a phase difference between these pulses.

The count value of the counter $C_A$ is transferred to the JK flip-flops 40 to 43 of the register $R_A$ by means of the TACH(D) pulse shown in FIG. 9(D). In FIG. 9, a maximum detectable phase difference is also denoted by $\Delta\Phi_M$ and a position of an imaginary reference pulse is shown by a chain line. The imaginary reference pulse position lies at a middle of $\Delta\Phi_M$ and corresponds to a center count value $2^{n-2}$ of the counter $C_A$. The left-hand TACH pulse laggs with respect to the imaginary reference pulse to an extent which lies within $\Delta\Phi_M$. For such a TACH pulse, the counter $C_A$ counts clock pulses for a time interval from the leading edge of the reference pulse to the TACH pulse and thus the count value exceeds the bias count $2^{n-2}$. When a TACH pulse laggs beyond $\Delta\Phi_M$ as shown by a second TACH pulse of FIG. 9(B), the counter $C_A$ counts $2^{n-1}$ clock pulses. When the counter $C_A$ counts a $(2^{n-1})$th clock pulse, $\overline{Q}$ output of the last stage JK flip-flop 47 of the counter $C_A$ changes to 0 and thus J and K inputs of the first stage flip-flop 44 of the counter $C_A$ become 0, so that the counter $C_A$ stops its counting operation. In this manner the maximum count value of the counter $C_A$ is always kept to $2^{n-1}$.

As shown by the third TACH pulse of FIG. 9(B), when the TACH pulse laggs with respect to the reference pulse over $T_{RH}$, i.e. the TACH pulse leads with respect to the reference pulse, after the counter $C_A$ has counted $2^{n-1}$ clock pulses, the counter is reset by a trailing edge of the reference pulse, so that its count value is decreased to 0.

As shown by the right-hand TACH pulse of FIG. 9(B), when the TACH pulse leads with respect to the imaginary reference pulse to an extent which does not exceed $\Delta\Phi_M$, the counter $C_A$ counts clock pulses, but its count value does not reach the bias count $2^{n-2}$.

In this manner, the phase comparator of this embodiment produces a binary number which corresponds to a phase difference between the imaginary reference pulse and the TACH pulse with the bias count $2^{n-2}$ being as a single stable point. When the TACH pulse laggs or leads with respect to the imaginary reference pulse over the maximum detectable phase difference $\Delta\Phi_M$, the count value is kept to $2^{n-1}$ or 0, so that the run-in time is reduced.

As described above, when use is made of the clock pulses having a repetition period of $T_C$[sec] which is sufficiently shorter than a repetition period $T_R$[sec] of the reference pulses and $T_R >> T_C \cdot 2^{n-2}$, the lagging and leading phase differences of the TACH pulses can be symmetrically detected as binary numbers with respect to the bias count of $2^{n-2}$ by means of the reference pulses having a duty cycle of about 50 percent.

2. Frequency Discriminator

Next the frequency discriminator 2' according to the invention will be explained in detail. The operational principle of the frequency discriminator of the invention is based on such a recognition that instead of detecting a change in the frequency of the TACH pulses to be controlled, changes in periods of the TACH pulses can be measured by determining how many clock pulses having a repetition period sufficiently shorter than that of the TACH pulses are inserted in an interval between successive TACH pulses. In this case, in order to improve the precision of the measurement, it is necessary to use the clock pulses having a extremely short repetition period, so that the number of clock pulses to be inserted in the intervals of the TACH pulses is increased. This results in increase of the number of stages of a counter for counting clock pulses.

In the frequency discriminator according to the invention, the number of stages of the counter can be decreased with improving the precision of the measurement by establishing suitable conditions. When a discrimination range is expressed as $\pm\Delta T$[sec] with respect to a center frequency of the discrimination having a period $T_R$[sec] and use is made of clock pulses having a repetition period of $T_C$[sec] which is equal to the measurement precision $\delta T$[sec] or shorter than $\delta T$, the necessary number of binary counting stages *m* can be determined as a minimum integer which satisfies the equation $\Delta T/T_C \leqq 2^{m-1}$.

FIG. 10 is a diagram for explaining the operational principle of the frequency discriminator 2' according to the invention. In the frequency discriminator of the invention, the frequency discrimination can be effected not only in a case that the period of the TACH pulse is equal to a pure binary multiple of the period of the clock pulse, but also in a case that the period of the TACH pulse is equal to any integer multiple of the period of the clock pulse. In the following explanation, the period of the TACH pulse is equal to the period $T_R$ of the center frequency of the discrimination for the sake of simplicity.

The counter is set to a set count $N_S$ by means of the TACH pulse at an instance $t_l$ of FIG. 10. Then the counter starts to count clock pulses. When the count value reaches $2^m - 1$, the count value changes by a $2^m$th clock pulse from $2^m - 1$ to 0 and the counter starts again to count clock pulses from zero count. Such a counting operation is repeated $(l - 1)$ times ($l$ is an arbitrary positive integer). Said set count value $N_S$ is selected in such a manner that when the count value reaches $2^{m-1}$ in a $l$th counting operation at an instance $t_{l+1}$ in FIG. 10, the equation $t_{l+1} - t_l = T_R$[sec] is satisfied. Therefore, the set count $N_S$ is determined by the period of the center frequency of the discrimination and the number of counter stages to be used and has different values depending on three conditions mentioned below. If the number of the clock pulses which can be inserted during the period $T_R$[sec] is expressed as $N_R$, it may be written as follows with using the number of stages m and positive integers L and N;

$$N_R = 2^m L + N \tag{3}$$

From conditions determined by the above-mentioned equation (3), $N_S$ and $l$ can be determined in the following three cases (*a*), (*b*) and (*c*).

*a.* in case of $N < 2^{m-1}$; $N_S = 2^{m-1} - N, l = L + 1$

*b.* in case of $2^{m-1} < N$; $N_S$ $2^m$ $(N - (N - 2^{m-1}), l = L + 2$

*c.* in case of $N = 2^{m-1}$; $N_S = 0, l = L + 1$

In this case a measurable range $\Delta F$[Hz] of the frequency discriminator is equal to $\pm T_C \cdot 2^{m-1}/T_R^2$ [Hz].

FIG. 11 shows a basic construction of the frequency discriminator according to the invention. As shown in FIG. 11, the frequency discriminator is consisted of a timing pulse generator 51, a counter 52 of m-stages and a register 53 of m-stages. FIG. 12 illustrates a concrete embodiment of the frequency discriminator according to the invention. In FIG. 12, the counter 52 comprises JK flipflops 54 to 56, the register 53 comprises JK flipflops 57 to 59 and the timing pulse generator 51 comprises JK flip-flops 66 to 68, AND gates 61, 64 and 54 and NAND gates 62 and 63. The timing pulse generator 51 receives the clock pulses and the TACH pulses and generates set pulses F necessary for controlling the operation of the counter 52, corrected clock pulses for frequency discrimination G which are formed by deleting a clock pulse at an occurrence of the set pulse F and write-in pulses H for writing outputs of the counter 52 into the register 53.

Figure 13:
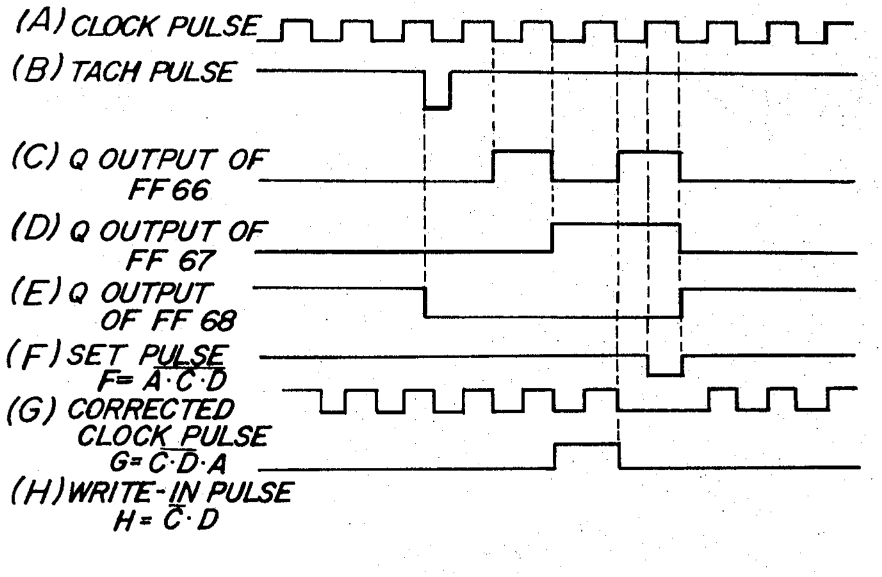

FIG. 13 shows wave forms for explaining the operation of the timing pulse generator 51. By constructing a logic circuit as shown in FIG. 12, the set pulse F, the corrected clock pulse G and the write-in pulse H can be obtained, which pulses F, G and H satisfy the following logic functions (4), (5) and (6), respectively.

$$F = \overline{A \cdot C \cdot D} \tag{4}$$

$$G = \overline{C \cdot D} \cdot A \tag{5}$$

$$H = \overline{C} \cdot D \tag{6}$$

Here, A represents the clock pulse, C expresses Q output of the JK flip-flop 66 and D denotes Q output of the JK flip-flop 67.

The JK flip-flops 66 to 68 in the timing pulse generator 51 starts to count clock pulses at a positive going edge of the TACH pulse shown in FIG. 13(B). When four clock pulses are counted, $\overline{Q}$ output of the flip-flop 68 is reversed to 0, and J and K inputs of the JK flip-flop 66 change to 0, so that the counting operation is inhibited until a negative going edge of the next TACH pulse will appear. In this manner the set pulse F, the corrected clock pulse G and the write-in pulse H are produced from the NAND gate 62, the AND gate 64 and the AND gate 65 as shown in FIGS. 13(F), (G) and (H), respectively.

FIG. 14 shows wave forms for explaining the operation of the counter 52 and the register 53. FIG. 14(A) shows count values of the counter 52, FIG. 14(B) the corrected clock pulses G, FIG. 14(C) the set pulses F, FIG. 14(D) the write-in pulses H, FIG. 14(E) the TACH pulses and FIG. 14(F) shows the content of the register 53. When the TACH pulse is supplied to the timing pulse generator 51, there is formed the set pulse F synchronized with the clock pulse. By means of the set pulse F, the counter 52 is set to the set value $N_S$. In this case, the set operation can be effected without an error, because in the corrected clock pulse G, onw of clock pulse corresponding to the set pulse position is deleted. Then the counter 52 starts to count the corrected clock pulses G and after the count value has reached $2^m - 1$, at a timing of a $2^m$th clock pulse the count value becomes 0 and the counter 52 starts again its counting operation. The counter 52 repeats such a counting operation $(l-1)$ times. In the $l$th counting operation, the count value is transferred to the register 53 by means of the write-in pulse H which occurrs just before a next set pulse F. The register 53 produces an output binary number of the frequency discriminator as shown in FIG. 14(F).

When the frequency of the TACH pulse is equal to the center frequency of the discrimination, the count value of the counter 52 in the $l$th counting operation reaches $2^{m-1}$ at a timing of occurrence of the write-in pulse H. But if the frequency of the TACH pulse is higher than the center frequency of discrimination, i.e. the period of the TACH pulse is shorter than the period $T_R$, the count value in the $l$th counting operation does not reach $2^{m-1}$. In this manner, a difference between the frequency of the TACH pulses and the center frequency of discrimination can be detected as a binary number which varies with respect to $2^{m-1}$ corresponding to zero frequency difference by suitably determining the set count $N_S$ in accordance with the three conditions mentioned above.

According to the invention, the functions of the phase comparison and frequency discrimination may be effected in a single circuit system to provide a phase-frequency discriminator which comprises a digital type high frequency response circuit having a differential function. In such a digital type high frequency response circuit, by providing the differential function with respect to input binary coded phase error signals, the signal treatment can be carried out digitally for phase in high-pass and leading phase mode to effect the frequency discrimination. That is, in the high frequency response circuit, there is provided a digital type calculating circuit having such a differential function that a difference of a binary coded input signal at an arbitrary time instance $t_i$ and that at a time instance $t_{i+1}$ which is lagged by $T_S$[sec] from said time instance $t_i$ is calculated and said difference is derived as an output signal. By changing said time interval $T_S$, it is possible to vary amplitude and phase characteristics of the calculating circuit.

Next, the phase-frequency discriminator using the high frequency response circuit will be explained in detail.

FIG. 15 shows a basic construction of such a phasefrequency discriminator. To a digital type phase comparator 73 described in the item (1) is connected the digital type high frequency response circuit 75. A binary coded phase error signal 74 corresponding to a phase difference between the TACH pulse 71 to be controlled and the reference pulse 72 and detected by the phase comparator 73 is applied to the high frequency response circuit 75 as an input. The high frequency response circuit 75 treats said phase error signal 74 in a differential mode to produce a binary coded output signal 76 as a frequency error signal so as to provide a function of the frequency discrimination.

A basic construction of the digital type high frequency response circuit is shown in FIG. 16. An input phase error signal 77 is sampled at a sampling period of $T_S$ in a sampler 78 and held to produce a minuend 79 and this minuend 79 is further lagged by a time $T_S$ in a delay device 80 to produce a subtrahend 81. The minuend 79 and subtrahend 81 are supplied to a subtractor 82 to produce a remainder 83 as an output frequency error signal. A transfer function H(S) of the transmitting system shown in FIG. 16 can be represented by the following equation (7) with taking into account a transfer characteristic of sampling-hold;

$$H(S) = (1 - e^{-ST_S}/ST_S \times (1 - e^{-ST_S}) \tag{7}$$

wherein

S: operator of Laplace transformation, $S = j2\pi f$;

$T_S$: sampling period and delay time of the delay device 80;

$e$: base of natural logarithm.

From the equation (7), a gain characteristic $|H(j2\pi f)|$ and a phase characteristic $\angle H(j2\pi f)$ are expressed as follows;

$$|H(j2\pi f)| = \sin(\pi \times f/fs)/\pi \times (f/fs) \times 2\sin(\pi \times f/fs) \tag{8}$$

$$\angle H(j2\pi f) = \pi/2 - 2\pi(f/fs) \tag{9}$$

wherein $f$ is a frequency of variation of the TACH pulses, and $fs$ is the sampling frequency $(1/T_S)$.

In the above equation (8), for a range of $0 < f/fs < 0.2$, the right-hand term $$\sin(\pi \times f/fs)/\pi \times (f/fs)$$

becomes nearly 1, so that the equation (8) can be rewritten into the following approximate equation (10), $$|H(j2\pi f)| = 2\sin(\pi \times f/fs) \tag{10}$$

From the above equations (10) and (9), if $f/fs$ is sufficiently small, it may be seen that the transmitting characteristic of the transmitting system shown in FIG. 16 is of high frequency passing and of phase advancing and can be approximated by a differential characteristic provided by $k(d/dt)$, wherein $k$ is a differential gain constant and $d/dt$ is a differential symbol. It is understood from the equations (10) and (9) that the amplitude and phase characteristics of the transmitting system can be varied by changing the frequency fs as a variable parameter.

Figure 18:
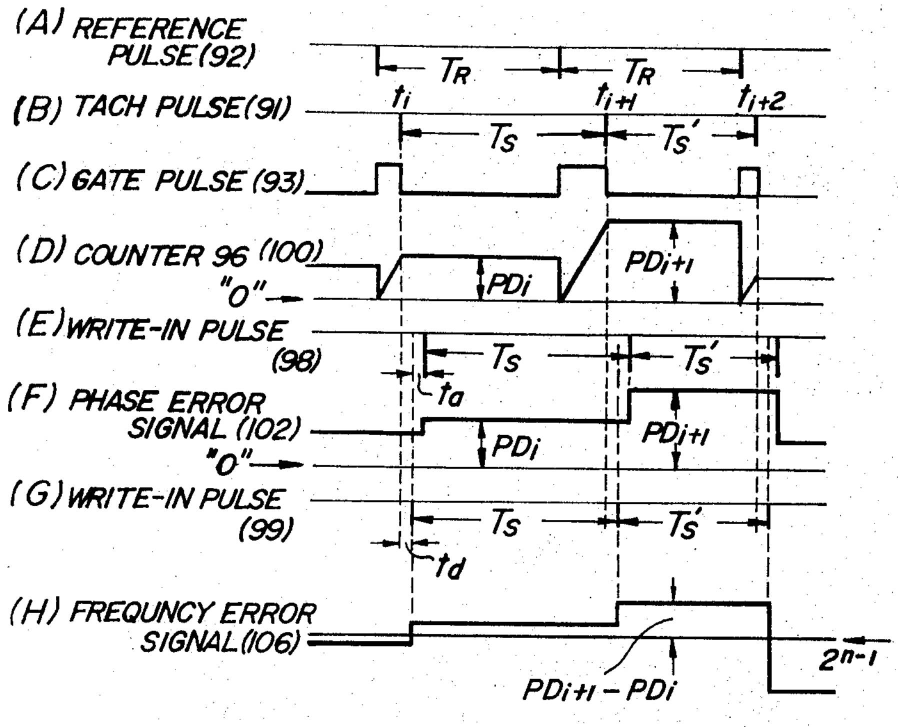

FIG. 17 shows an embodiment of the phase frequency discriminator and FIG. 18 illustrates various wave forms at various portions for explaining the operation. In the following explanation, the sampling period $T_S$ is assumed to be equal to the TACH pulse period for the sake of simplicity. In FIG. 17, an RS flip-flop 90 produces a gate pulse 93 having a duration corresponding to a phase difference between the TACH pulse 91 (time periods $T_S$, $T_S'$ . . . ) and the reference pulse 92 (time period $T_R$). This gate pulse 93 is applied to an AND gate 95 together with the clock pulses 94 and gates out clock pulses. The number of clock pulses thus gated out is counted by a binary counter 96 of n stages. The TACH pulse 91 is also applied to a delay circuit 97. The delay circuit 97 produces an input register write-in pulse 98 of a time interval $T_S$[sec] and an output register write-in pulse 99 of a time interval $T_S$[sec], which pulses 98 and 99 are delayed by periods $(td + ta)$ [sec] and $td$[sec], respectively with respect to the TACH pulse 91.

A counter output 100 of said binary counter 96 is written into an input register 101 of n stages by means of the input register write-in pulse 98 and stored in the input register 101. Thus from the output of the input register 101, is obtained a binary coded phase error signal 102 corresponding to the phase difference between the TACH pulse 91 and the reference pulse 92. In a subtractor 103 of n stages, a minuend, i.e., the count output 100 of the binary counter 96 is subtracted by a subtrahend, i.e., an output 102 of the input register 101 to produce a difference output 104. This difference output 104 is written-in the output register 105 of n stages by means of the output register write-in pulse 99 and stored therein. From the output of the output register 105 is derived a binary coded frequency error signal 106 corresponding to the frequency error of the TACH pulse with respect to the reference pulse 92.

Next, the write-in timings of said input register 101 and output register 105 are explained with reference to FIG. 18. FIG. 18(A) shows a wave form of the reference pulses 92, FIG. 18(B) a wave form of the TACH pulses 91, FIG. 18(C) a wave form of the gate pulses 93, FIG. 18(D) a wave form of the output count 100 of the binary counter 96 in the D-A converted form, FIG. 18(E) a wave form of the write-in pulses 98 for the input register 101, FIG. 18(F) a wave form of the phase error signal 102 from the input register 101 in the D-A converted form, FIG. 18(G) a wave form of the output register write-in pulses 99 and FIG. 18(H) illustrates a wave form of the frequency error signal 106 from the output register 105 in the D-A converted form. As shown in FIG, 18, the output register write-in pulse 99 is delayed by a certain period $td$[sec] which is somewhat longer than the time period necessary for calculation (in general one period of the clock pulses 94) with respect to the TACH pulse 91. The input register write-in pulse 98 is delayed by a certain period $ta$[-sec] (in general, one period of clock pulses 94) with respect to the output register write-in pulses 99. By setting the write-in timings for both registers 101 and 105 in this manner, the phase error amount $PD_t$ of the output 100 from the binary counter 96 at a timing $t_t$ is heold in the input register 101 for a time period $T_S$ of the input register write-in pulses 98 so as to produce an output 102 from the input register 101. A difference value of the phase error amount $PD_{t+1}$ of the binary counter output 100 at the timing of $t_{t+1}$ and the phase error amount $PD_t$ of the output 102 of the input register which has been held in the input register 101 is written into the output register 105 by means of the output register write-in pulse 99 at the timing of $t_{t+1}$ and stored therein. In this manner, a binary code $(PD_{t+1} - PD_t)$ corresponding to the frequency error can be obtained as an output 106 of the output register.

As explained above, by connecting said digital type high frequency response circuit to the digital type phase comparator, it is possible to combine the phase error detecting function and the frequency error detecting function in a single circuit system so as to enable a series treatment of the error signal. Moreover, it is possible to change a discrimination ratio of the error detection by changing the write-in period $T_S$ to the register, for example, by frequency-dividing the TACH pulses.

In case of using the high frequency response circuit as a digital type high pass filter or a phase advancing circuit other than the frequency discriminator, the write-in period $T_S$ may be changed to vary the cut-off frequency of the circuit, so that desired amplitude and phase characteristics can be obtained.

Moreover, by interchanging the minuend and subtrahend it is possible to interchange the polarity of differential coefficient of the circuit.

3. Frequency Modulator

The frequency modulator 3' according to the invention is constituted by a binary counter which has a division ratio changing in dependence on a binary coded modulating signal and produces output FM pulses having a varying repetition frequency. In such a frequency modulator, it is necessary to use a carrier pulse which corresponds to a carrier wave in an analogue type frequency modulator.

When the carrier pulse frequency is represented by $f_F$ and the clock pulse frequency is expressed by $f_C$, a division ratio $N_F$ corresponding to the carrier pulse frequency is given by the following equation (11).

$$N_F = f_C/f_F \tag{11}$$

The number of stages m of the binary counter is determined in such a manner that the following equations (12) and (13) are satisfied. In these equations n is the number of bits of the binary coded modulating signal.

$$n < m - 1 \tag{12}$$

$$2^{m-1} \leqq N_F \leqq 2^m - 2^{n-1} \tag{13}$$

Here $2^{n-1}$ is a bias count of the counter, which will be explained later.

If the frequency modulator is consisted of a counter of m stages, the counter is so constructed that it produces an output FM pulse when the count value reaches $2^m - 1$ and this output FM pulse is used as a set pulse and at a timing of a next clock pulse the counter is set to a count value $N_S$ which is established by the following equation (14).

$$N_S = 2^m - (N_F + 2^{n-1}) \tag{14}$$

By determining the set count $N_S$ as defined by the equation (14), when the modulating signal is equal to the bias count $2^{n-1}$, the frequency of output FM pulse is equal to the carrier pulse frequency $f_F$. At a suitable timing in the counting operation, the modulating signal (binary number) is written into the counter.

Figure 20:
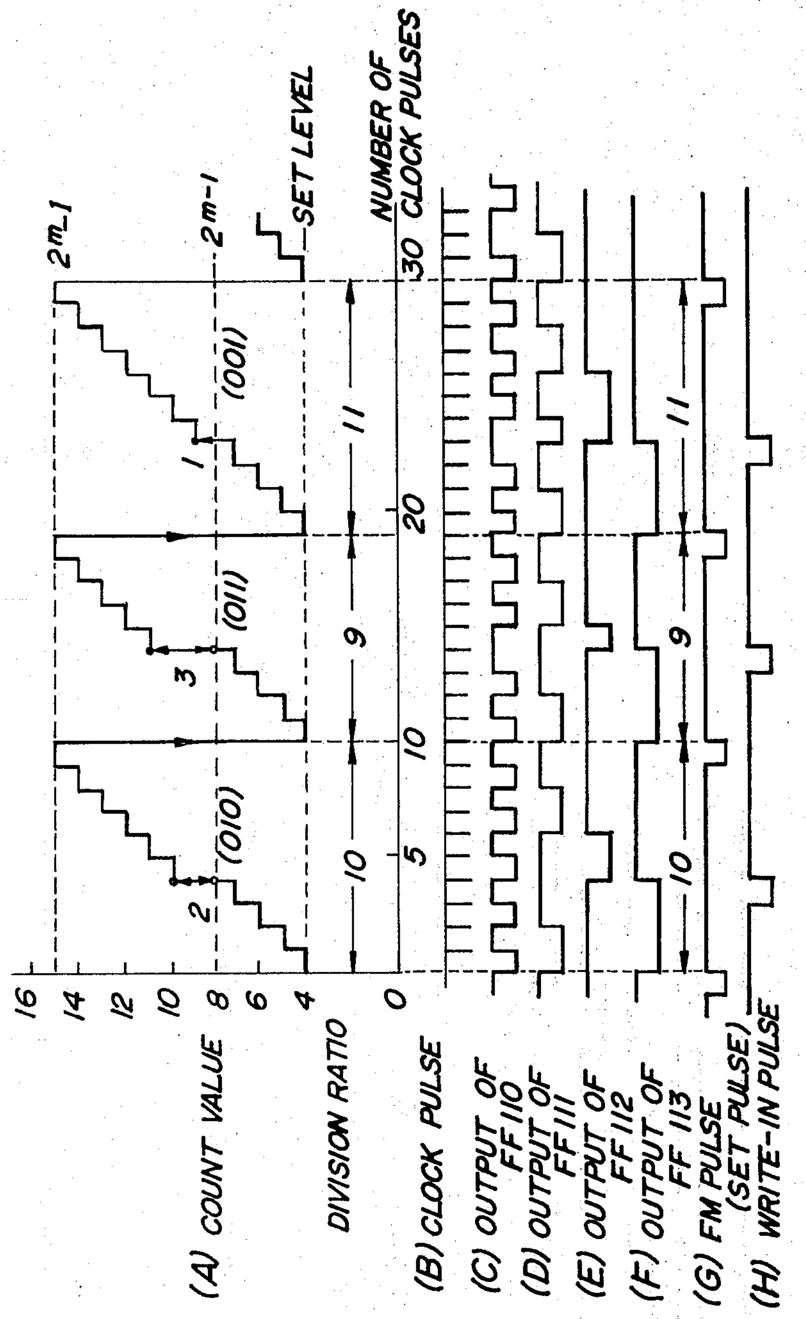

FIG. 19 shows an embodiment of the frequency modulator of the invention operating on the basis of the above-mentioned principle and FIG. 20 illustrates various wave forms for explaining the operation of the frequency modulator of this embodiment. In this embodiment, $m = 4$, $n = 3$, $N_F = 10$ and $N_S = 4$.

As shown in FIG. 19, the frequency modulator comprises a binary counter consisted of JK flip-flops 110 to 113. FIG. 20(A) shows count values of the counter. FIG. 20(B) illustrates the clock pulses and FIGS. 20(C) to (F) show Q outputs of the Jk flip-flops 110 to 113, respectively. FIG. 20(G) depicts the FM pulses serving as the set pulses and FIG. 20(H) illustrates the write-in pulses.

In FIG. 20, there are shown wave forms for three cases, i.e., the input modulating signal is equal to the bias value (2), the modulating signal is equal to the bias value plus 1 (2 + 1 = 3) and the modulating signal is equal to the bias value minus 1 (2 − 1 = 1). The division ratios for these cases are 10, 9 and 11, respectively.

For example, when the modulating signal is equal to the bias value 2 as shown in a left-hand section of FIG. 20, the counter is first set to $N_S = 4$ by means of the FM pulse (set pulse). The count value reaches 8 at a timing of the fourth clock pulse. At this timing, the modulating signal 2 is transferred to the counter by means of the write-in pulse, so that its count value jumps to 10. After that the counter produces a FM pulse at the sixth clock pulse. Thus, the counter has counted 10 clock pulses during an interval of the successive FM pulses, so that the division ratio is equal to 1/10.

At first an operation of setting the set count $N_S$ into the counter will be explained in detail. Q output levels of the JK flip-flops 110 to 113 are shown in FIGS. 20(C) to (F). These Q output levels correspond to first to fourth digits of a counted binary number. When a count value reaches a binary number 15(1111), J and K inputs of the JK flip-flop 112 become a lower level 0, so that at a timing of a next clock pulse the JK flip-flops 110, 111 and 113 are inverted from 1 to 0, but the JK flip-flop 112 remains in its higher level 1. Thus the counter is set to a binary number 4(0100).

Next an operation of transferring a modulating signal to the counter will be explained. After the setting operation explained above, when the count value reaches a binary number 7(0111), the write-in pulse shown in FIG. 20(H) becomes a higher level 1. If the modulating signal is equal to a binary number 2(010), J and K inputs of the JK flip-flop 111 become a lower level 0 and these of the JK flip-flops 110 and 112 become a higher level 1. Thus at a timing of a next clock pulse, JK flip-flops 110 and 112 reverse their conditions from 1 to 0 and the JK flip-flop 113 changes from 0 to 1, but the JK flip-flop 111 does not change its 1 condition. In this manner the count value changes to a binary number 10(1010) and it results in that the counter has counted two clock pulses additionally. That is, the count value jumps from 7 to 10 at a timing of the write-in pulse.

4. Phase Modulator

The phase modulator 4' according to the invention is constituted by a binary counter which has a pulse delay time varying in dependence on a binary coded modulating signal and produces output PM pulses of a varying phase. That is, at a suitable timing in the counting operation of the binary counter (delay counter) which starts its counting operation by means of pulses to be modulated, the binary coded modulating signal is transferred to the delay counter and when the count value reaches a given value, the counter produces output pulses having modulated phases.

Figure 22:
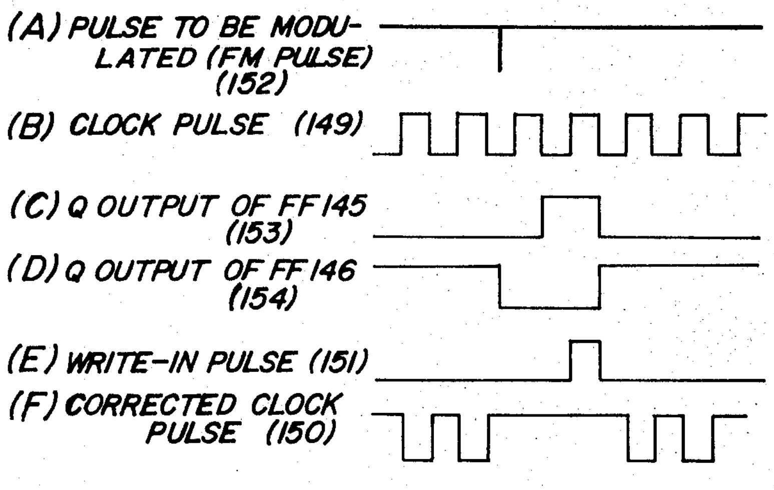

An embodiment of the phase modulator 4' according to the invention will be explained with reference to FIGS. 21 and 22. In FIG. 21, JK flip-flops 131 to 135 constitutes a non-synchornized type binary counter serving as a delay counter. NAND gates 136 to 141 form a gate circuit for writing a binary coded modulating signal of three bits into the delay counter 131 to 135. In FIG. 21, the three bits of the modulating signal are denoted by reference numerals 142, 143 and 144, respectively. JK flip-flops 145 and 146, a NAND gate 147 and an AND gate 148 constitute a timing pulse generator for producing corrected clock pulses 150 and writein pulses 151 on the basis of clock pulses 149.

FIG. 22(A) shows pulses 152 to be modulated, i.e., the FM output pulses from the frequency modulator explained above. FIG. 22(B) illustrates the clock pulses 149 and FIGS. 22(C) and (D) show Q outputs 153 and 154 of the JK flip-flops 145 and 146, respectively. FIG. 22(E) shows the write-in pulses 151 and FIG. 22(F) illustrates the corrected clock pulses 150 for the delay counter.

The JK flip-flops 145 and 146 constitute a binary counter of two stages. When the FM pulse 152 to be modulated is supplied to the phase modulator, all of the JK flip-flops 131 to 135, 145 and 146 are reset, so that the count values of the delay counter 131 to 135 and the two stage counter 145 and 146 are returned to zero. In the timing pulse generator a write-in pulse 151 is produced by deriving a clock pulse which is delayed by several clock pulse periods, in this case two clock pulse periods from the pulse 152 to be modulated. During an occurrence of the write-in pulse 151, the three bits 142, 143 and 144 of the modulating signal are supplied to the NAND gates 136 to 138 via the NAND gates 139 to 141, respectively as gate output pulses 155 to 157. At this instance, as shown in FIG. 22, the corrected clock pulse 150 is in a logic 1 level, i.e., a higher level and $\overline{Q}$ outputs of the JK flip-flops 131 and 132 are also in a logic 1 level, so that the three bits 142 to 144 of the modulating signal pass through the NAND gates 136 to 138 and supplied to the trigger terminals T of the JK flip-flops 131 to 133 as gate output pulses 160 to 162. If the bit 142 of the modulating signal is in a logic level 1, the gate output pulse 160 is a positive pulse and the JK flip-flop 131 changes its state at a trailing edge of the gate output pulse 160, whereas if the bit 142 of the modulating signal is in a logic level 0, the gate output pulse 160 is in a logic level 0, so that the JK flip-flop 131 does not change its state and remains its reset condition. For the remaining NAND gates 137 and 138 and JK flip-flops 132 and 133, the same operation as described above is effected. In this manner the three bits 141 to 143 of the modulating signal are written into the JK flip-flops 131 to 133, respectively of the delay counter.

After the modulating signal has been written into the delay counter, the write-in pulse 151 drops to a logical level 0 and then all outputs 155 to 157 of the NAND gates 139 to 141 become a logical level 1. The JK flip-flops 131 to 135 constitute an asynchronous type binary counter together with the NAND gates 136 to 138. The counter counts the corrected clock pulses 150 in addition to the count value which has been written previously. When the count value reaches a digital amount of $2^4$, Q output 163 of the JK flip-flop 135 changes from 1 to 0 and the J and K input terminals of the JK flip-flop 131 become 0 and as the result the counting operation of the delay counter is stopped. In the manner mentioned above, from the Q output 164 of the JK flip-flop 134, is obtained output pulses (PM pulses) which have been phase-modulated by the modulating signal.

The delay counter of the phase modulator according to the invention may be formed by a synchronous counter. In such a phase modulator high operation speed and high accuracy can be obtained. In this case, in order to write a binary coded modulating signal into the counter, use is made of set inputs and reset inputs of flip-flops consisting of the delay counter and counting means and write-in means are separated from each other so as to construct the synchronous counter. FIG. 23(A) shows pulses to be modulated and FIG. 23(B) illustrates outputs from the delay counter in the D-A converted form. The binary coded modulating signal $N_i$ of n bits is written into the delay counter at a timing of a pulse (FM pulse) to be modulated and then clock pulses are counted in addition to said written-in value. When the count value reaches a given value $N_C$, a PM pulse is produced. In this manner, the phase modulated pulses shown in FIG. 23(C) can be obtained.

The phase modulation of the pulse to be modulated is expressed by the following equation (15) for each digit of the modulating signal;

$$2\pi f_F/f_C[\text{rad}] \tag{15}$$

wherein $f_F$ is a frequency ( = $1/T_F$) of the pulse to be modulated, and $f_C$ is the clock pulse frequency.

The maximum phase modulation for the modulating signal is expressed by the following equation (16).

$$(2^n - 1) \times 2\pi f_F/f_C[\text{rad}] \tag{16}$$

FIG. 24 shows an emdodiment of such a phase modulator consisted of the synchronous type counter which handles the modulating signal of three bits. FIGS. 25(A) to (F) illustrate wave forms at various points of the phase modulator.

In FIG. 24, JK flip-flops 171 to 175 having set terminals S and reset terminals R and AND gates 176 to 178 consist the synchronous counter which serves as the delay counter. Jk flip-flops 179 and 180 and an AND gate 181 construct a timing pulse generator. AND gates 182 to 187 constitute a gate for writing contents of binary coded modulating signal 188, 189; 190, 191; 192, 193 of three bits into the delay counter. Here the modulating signal 188 and 189, 190 and 191 and 192 and 193 show combinations of $\overline{Q}$ and Q output signals of JK flip-flops consisting an output register of the frequency discriminator. It should be further noted that set and reset operations of the JK flip-flops 171 to 175, 179 and 180 are effected at a logical level 1.

Figure 25:
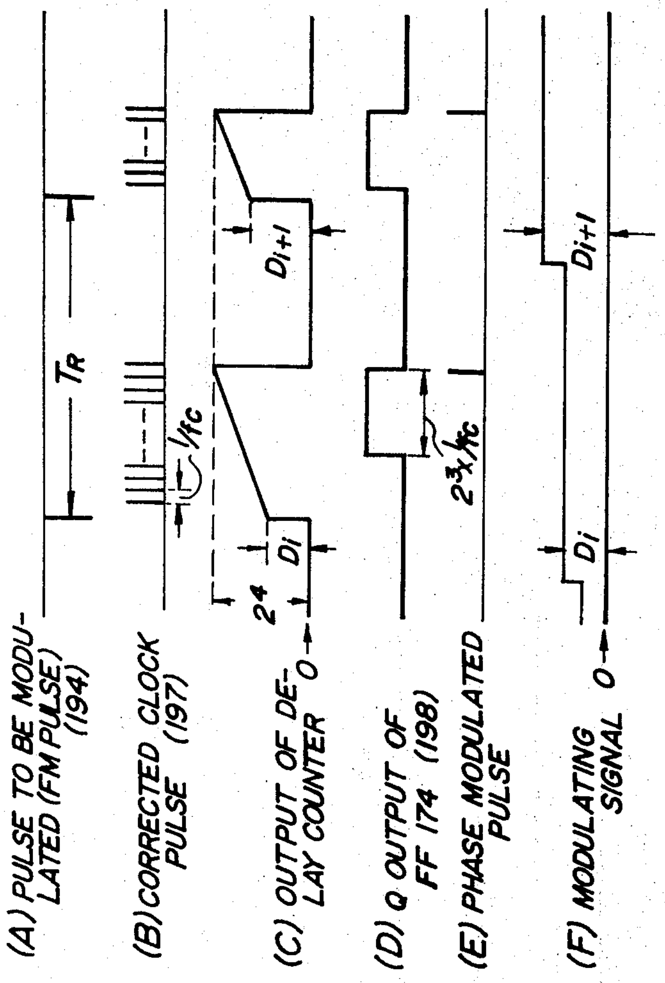

A pulse (FM pulse) 194 to be modulated having a period $T_F$[sec] shown in FIG. 25(A) are supplied parallely to the AND gates 182 to 187 as a write-in pulse and at a timing of the write-in pulse, the three bits 188, 189; 190, 191; 192, 193 of the modulating signal are passed through the AND gates 182 to 187, respectively and transferred to the set terminals S and reset terminals R of the JK flip-flops 171 to 173, respectively. These JK flip-flops 171 to 173 are either set or reset in accordance with the modulating signal thus transferred. In this manner the binary coded modulating signal 189, 191, 193 are written in the delay counter. At the same time, both the JK flip-flops 174 and 175 are reset by the pulse 194 to be modulated. In this condition, $\overline{Q}$ output 195 of the JK flip-flop 175 is 1.

After the modulating signal has been written into the JK flip-flops 171 to 173 in the manner described above, in the timing pulse generator, consisted of the JK flip-flops 179 and 180 and the AND gate 181, corrected clock pulses 197 shown in FIG. 25(B) are formed by deleting several pulses (in the present case two clock pulses) from the clock pulses 196 by means of the AND gate 181 with the pulse 194 to be modulated being a reference. By means of such corrected clock pulses 197, a stable counting operation can be achieved. These corrected clock pulses 197 are supplied each of the JK flip-flops 171 to 175 of the delay counter and the counting operation is carried out at the timings of such clock pulses. FIG. 25(C) shows count values of the delay counter by decoding outputs from the first to fourth bits of the delay counter and converting them into analogue signal levels. During the counting, when the count value reaches $2^{n+1}$ (in this case $2^4$), the Q output 198 of the JK flip-flop 174 changes from 1 to 0 and the $\overline{Q}$ output 195 of the flip-flop 175 of the last bit changes from 1 to 0 and thus the AND gate 181 is disabled to stop the counting operation of the delay counter. By effecting the counting operation in the manner mentioned above, the Q output 198 of the JK flip-flop 174 is derived as shown in FIG. 25(D) and by producing pulses at trailing edges of the Q output 198 the phase modulated output pulses (PM pulses) can be obtained as shown in FIG. 25(E).

FIG. 25(F) illustrates the binary coded modulating signals 188 to 193 in the D-A converted form.

In the above explanation, the modulating signal is formed by three bits, but the modulating signal may be formed by more than four bits. In such a case the numbers of flip-flop stages consisting the synchronous binary counter and of AND gate stages for controlling the write-in operation of the modulating signal may be increased in accordance with the number of bits. Further if it is required to invert the polarity of the phase modulation for the modulating signal, the polarity of bits of the modulating signal 188 and 189, 190 and 191, and 192 and 193 may be reversed. In the above embodiment, the delay counter is constructed by the JK flip-flops, but it is a matter of course to form the delay counter by shift-register type flip-flops constructing a steering circuit having at least set, reset and clock triggering terminals.

5. Gain Adjustor

A gain adjustor in the digital control system according to the invention is consturcted by a calculator to adjust gains of integral, differential and proportional control loops and to add necessary bias values to the detected values. When a deviation value is expressed as A and a bias value is represented as N, an output of the phase comparator or the frequency discriminator can be expressed as (A + N). If this output is multiplied by $k$ ($k \leqq 1$) in the gain adjustor, the bias value which has been calculated becomes kN. In order to keep the bias value constant irrespective to k, a value of $N(1-k)$ must be added to the value which is obtained after calculation. By this measure only the deviation value A can be multiplied by $k$, while the bias value can be kept constant.

FIG. 26 shows an embodiment of the gain adjustors 5′, 6′ and 7′ and an adder 12′ of the digital control system shown in FIG. 4. In this embodiment each of the bias values of a phase comparator 1′, a frequency discriminator 2′, a frequency modulator 3′ and a phase modulator 4′ is 32 and loop gains of integral, proportional and differential controls are ¼, ½ and ¼, respectively.

In the gain adjustor according to the invention, it is sufficient to effect a calculation of, for example, $k = I/2^i$, wherein $i$ and I are arbitrary positive integers and $I \leq 2^i$.

In order to divide a binary number by $2^i$, the contents stored in a register may be shifted right-wards by times corresponding to $i$. For example, if a binary number 8(1000) is divided by 2, a binary number 4(0100) may be obtained. In this manner a multiplication of a binary number by ⅛ can be effected by shifting and addition or subtraction. For example, calculations of ⅝ and ⅞ can be carried out as (½ + ⅛) and (1 − ⅛), respectively.

FIG. 27 shows another embodiment of the gain adjuster according to the invention. In this embodiment, the division is effected by changing connections by means of a rotaty type switch, etc. and the addition of a bias value is effected by means of simple logic circuits. That is, after a bias value is subtracted from an input binary number and then the division is effected upon a remainder and finally the bias value is added to a quotient.

If it is assumed that gain adjusting factor is equal to $½^i$ and a bias value is equal to $2^{n-2}$, there are existed the following relations between an input binary number $(A_1A_2 \ldots A_n)$, a binary number $(B_1B_2 \ldots B_n)$ after subtraction of the bias value, a binary number $(C_1C_2 \ldots C_n)$ after division by the gain adjusting factor and a binary number $(D_1D_2 \ldots D_n)$ after addition of the bias count.

$$B_r = A_r (r = 1,2,\ldots,n-2),\ B_{n-1} = \overline{A_{n-1}},\ B_n = \overline{A_{n-1}} \cdot \overline{A_n}$$

$$C_s = B_{s+i} (s = 1,2,\ldots n-i),\ C_{s'} = B_n (s' = n-i+1, \ldots n)$$

$$D_t = C_t (t = 1,2,\ldots,n-2),\ D_{n-1} = \overline{C_{n-1}},\ D_n = 0$$

FIG. 27 shows a logic circuit which can effect the above logic operation and by only changing connections between $B_r$ and $C_r$, it is possible to adjust the loop gain from ½ to $½^{n-2}$.

Next another embodiment of the gain adjustor according to the invention will be explained with reference to FIG. 28. The gain adjustor of this embodiment is included in the integral control loop. According to the invention the adjustment of gain of the integral loop can be effected with independent of a control accuracy and quantum noise by adding to the integral control loop of the digital control system a sampling circuit and a frequency divider of simple construction. That is, in the present embodiment there are provided the sampling circuit for switching an input binary number ($N_b$) which is a modulating signal of the frequency modulator and a binary number (bias value) $N_a$ at which output pulses of the frequency modulator is the center frequency (carrier pulse frequency) and the frequency divider for forming sampling pulses for said sampling circuit, whereby the gain of the integral control loop is adjusted by changing a division ratio of the frequency divider.

In FIG. 28, a counter 200 and a register 203 constitute the phase comparator described in the item (1). As already explained, in the phase comparator 1′ a phase difference between the reference pulse 201 and a pulse to be controlled, for example, the TACH pulse is detected as a binary number $N_b$ and the binary number thus detected is stored in the register 203. The binary number $N_b$ thus stored is supplied to a frequency modulator 205 through a sampling circuit 204. The frequency modulator 205 is so constructed that when the input modulating signal is a given number (bias value $N_a$), it produces the center frequency (carrier pulse frequency) $f_F$.

Figure 29:
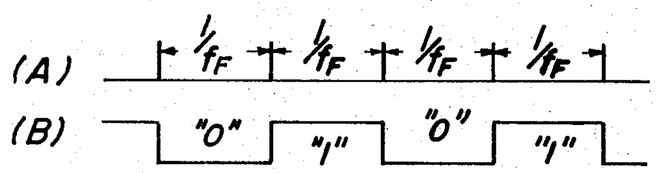

Now the operation of the integral control loop comprising the gain adjustor will be explained with reference to FIG. 29. FIG. 29(A) shows output FM pulses from the frequency modulator 205 and FIG. 29(B) illustrates sampling pulses which are formed by dividing the output FM pulses with a division ratio of 2 in a frequency divider 206. The sampling circuit 204 is so constructed that its output is $N_a$ when the sampling pulse is at a low level 0 and $N_b$ when the sampling pulse is at a high level 1. Thus the frequency modulator 205 produces the center frequency $f_F$ when the sampling pulse is at a low 0 and when the sampling pulse is at a high level 1, the frequency of the output FM pulse changes to $1/(1/f_F - \Delta t)$ in dependence on a number $N_b$. Here $\Delta t$ is given by $\Delta t = (N_b - N_a)/f_C$, wherein $f_C$ is the frequency of clock pulses 207.

Figure 30:
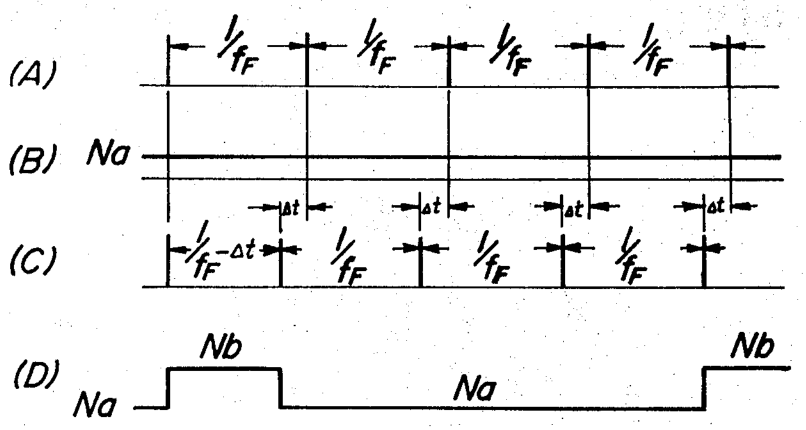

As described above the frequency modulator 205 produces output pulses of the center frequency $f_F$[Hz] when an output binary number from the sampling circuit 204 serving as a modulating signal is $N_a$. In other words the output FM pulses have a constant period $1/f_F$[sec]. This situation is shown in FIGS. 30(A) and (B). FIGS. 30(A) and (C) show output FM pulses and FIGS. 30(B) and (D) illustrate the modulating signal. As shown in FIG. 30(D), when the modulating signal has a number $N_b$ instead of $N_a$, the output FM pulse has a period of $1/f_F - \Delta t$[sec]. In FIG. 30(D), the modulating signal has a value $N_b$ at a rate of one period out of four periods of the output FM pulses. Thus the output FM pulses have a period $1/f_F - \Delta t$[sec] only when the modulating signal is $N_b$ and have a period $1/f_F$[sec] when the modulating signal is $N_a$. In this manner the output FM pulses maintain the phase difference $\Delta t$[sec] with respect to the output FM pulses shown in FIG. 30(A) for four periods and the phase difference is accumulated every four periods. Thus the sampling circuit 204 and the frequency modulator 205 has a sampling-hold characteristic.

Figure 31:
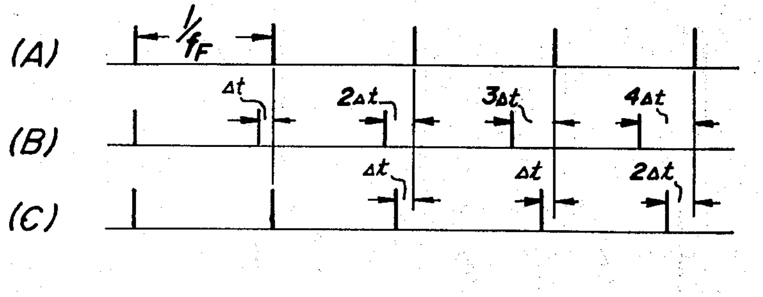

The adjustment of the loop gain of the integral control loop can be effected by changing the frequency of the sampling pulses supplied from the frequency divider 206. Next, this adjustment of the loop gain will be explained with reference to FIG. 31. FIG. 31(A) shows output FM pulses have the center frequency $f_F$ from the frequency modulator 205. FIG. 31(B) illustrates output FM pulses from the frequency modulator 205 in case of the divisional ratio of the frequency divider 206 being 1/1. FIG. 31(C) depicts output FM pulses from the frequency modulator 205 in case of the division ratio of the frequency divider 206 being 1/2. If it is assumed that when the binary number $N_b$ is applied as the modulating signal to the frequency modulator 205 from the register 203, a period of the output FM pulses becomes shorter than that of the center frequency $f_F$ by $\Delta t$[sec], the time difference $\Delta t$ is accumulated as shown in FIG. 31(B) for each period of the output FM pulses shown in FIG. 31(A), when the division ratio of the frequency divider 206 is set to 1/1. When the division ratio is selected to 1/2, the time difference $\Delta t$ accumulated for every two periods as shown in FIG. 31(C) and thus an average gain becomes a half of that obtained in a case of the division ratio of 1/1. In general, if the division ratio of the frequency divider 206 is set to $1/n$, the loop gain becomes $1/n$. In this manner the loop gain can be adjusted by changing the division ratio of the frequency divider 206.

6. Repetition Frequency of Clock Pulses

In the digital control system according to the invention clock pulses of high stability from a crystal oscillator are used to produce input and output pulses of various portions of the control system. Therefore, it is important how to establish the repetition frequency of the clock pulses for operating the digital control system in a stable manner.

To this end, according to the invention the repetition frequency of the clock pulses are established in such a manner that it keeps integer relation with respect to each of the frequencies of reference vertical synchronizing pulses, reference horizontal synchronizing pulses of the television signal and motor driving pulses.

According to the invention, the output FM pulses from the frequency modulator are obtained by frequency-dividing the clock pulses as explained in the item (3). Therefore, if the output FM pulse frequency from the frequency modulator and the clock pulse frequency are $f_F$ and $f_C$, respectively, the following equation (17) is satisfied.

$$f_C = N \cdot f_F \tag{17}$$

wherein N is an arbitrary positive integer (which is equal to the frequency division ratio of the frequency modulator). The motor driving pulse (the center frequency of which is $f_M$) is obtained by multi-phase dividing the ouput FM pulses from the frequency modulator in a phase divider, so that the following relation can be obtained;

$$f_F = K \cdot f_M \tag{18}$$

wherein K is an arbitrary positive integer (which is equal to the frequency division ratio of the multi-phase divider).

In connection with the television standards, in order to synchronize a center value of the number of rotation per second of the head motor (said center value has an integer relation with respect to the center frequency $f_M$ of the motor driving pulses) with the reference vertical synchronizing pulses (frequency $f_V$) of the television signal, it is necessary to satisfy the following relation, $$f_M = M \cdot f_V \tag{19}$$

wherein M is a constant determined by the television standards and type of the head motor to be used and in NTSC system having 525 lines per frame and 60 fields per second and a two-pole three-phase motor is used, M = 4. From the equations (18) and (19), the following equation (20) may be obtained.

$$f_F = M \cdot K \cdot f_V \tag{20}$$

In the NTSC television standards of 525 lines and 60 fields, since $2f_H = 525 f_V$ is established, the equation (20) may be rewritten as follows with considering M = 4.

$$f_F = 8 \cdot K \cdot f_H / 525 \tag{21}$$

From the equations (17) and (21) the clock pulse frequency $f_C$ is given by the following equation (22).

$$f_C = 8 \cdot N \cdot K \cdot f_H / 525 \tag{22}$$

On the other hand, in the servo system of VTR, it is advantageous to stabilize the operations of the various circuits of the digital servo system and to decrease quqntum noise at the phase comparator by phase-coupling outputs of the crystal oscillator generating the clock pulses (frequency $f_C$) with the reference horizontal synchronizing pulses (frequency $f_H$) of the television signal. For this purpose the clock pulse frequency $f_C$ is selected to an integer multiple of the reference horizontal synchronizing pulse frequency $f_H$ and a new clock pulse frequency $f_C'$ is established as follows.

$$f_C' = 8n \cdot N \cdot K \cdot f_H \tag{23}$$

In the equation (23), n and N are arbitrary positive integers, so that use can be made of an arbitrary positive integer L which satisfies $n \cdot N = L$ and then the equation (23) may be resritten as follows;

$$f_C' = 8L \cdot K \cdot f_H \tag{24}$$

The equation (24) may be further rewritten as follows with using the reference vertical synchronizing pulse frequency $f_V$ and the center frequency $f_M$ of the motor driving pulses.

$$f_C' = 2100L \cdot K \cdot f_V \tag{25}$$

and $$f_C' = 525L \cdot K \cdot f_M \tag{26}$$

Therefore, the repetition frequency $f_C'$ of the new clock pulses has an integer relation with respect to the reference vertical synchronizing pulse frequency $f_V$, the reference horizontal synchronizing pulse frequency $f_H$ and the center frequency $f_M$ of the motor driving pulses, that is the clock pulse frequency $f_C'$ is determined to be a common multiple of $f_V$, $f_H$ and $f_M$. By establishing the clock pulse frequency in the manner mentioned above as being the integer relation with $f_V$, the phase relation of the clock pulse $f_C$ with respect to $f_V$ is kept constant as shown in FIGS. 32(A) and (C). Thus the number of the clock pulses existing in a given phase difference between the reference pulse $f_V$ shown in FIG. 32(A) and the TACH pulses shown in FIG. 32(B) is always kept constant. From the same reason the detecting accuracy of the frequency discriminator can be made high and also the control accuracy of the frequency modulator and the phase modulator can be increased.

According to the invention, for example an integral control loop is used with an automatic phase adjusting circuit and a steady rotation phase of a video head drum at the recording time can be kept in a given phase relation with respect to reference composite synchronizing pulses by means of digital circuits operating stably against temperature and supply voltage variations.

FIG. 33 shows an embodiment of the digital control system according to the invention comprising an integral control loop effecting a phse control of TACH pulses representing positions of the video head drum of VTR. The digital control system of this embodiment comprises a clock pulse generator 210, a frequency modulator 211, a three-phase divider 212, a motor driving amplifier 213, a head motor 214, a video head drum 215, a TACH pulse generator 216, a counter 217 and a register 218 of a phase comparator, a third-serration-pulse separating circuit 219, a control signal generator 220, a phase shifter 221, a frequency divider 222 and a reference pulse generating counter 223.

In the frequency modulator 211, a counting ratio for output clock pulses from the clock pulse generator 210 is changed in dependence on magnitude of a binary number supplied from the register 218 so as to change the frequency of the output pulses. The frequency modulator 211 is so constructed that when the binary number from the register 218 is a given value (bias value) N, outputs of the frequency modulator 211 has a center frequency (carrier frequency). In this case the head motor 214 rotates at a steady rate. The binary number stored in the register 218 represents a phase difference of the TACH pulses *c* with respect to the reference phase pulses *g* detected by the counter 217 of the phase comparator in the form of the number of clock pulses. Thus the phase of the TACH pulses *c* at the steady rotating condition of the head motor 214 is made stable at a position which has a phase difference of N clock pulses with respect to the reference pulse *g*.

Figure 34:
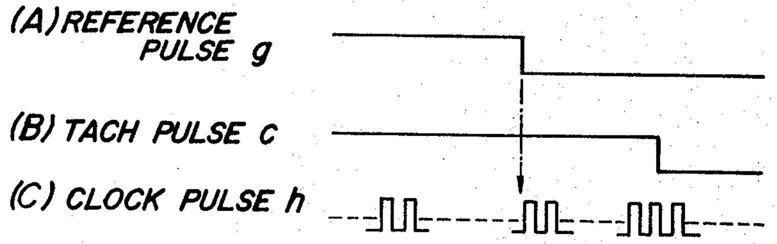

The operation of the control system under the steady state of the TACH pulses *c* will be explained with reference to FIG. 34. FIG. 34(A) illustrates the reference pulse *g*, FIG. 34(B) the TACH pulse *c* under the steady rotation of the head motor 214 and FIG. 34(C) shows the clock pulses *h*. The reference pulses *g* is obtained by frequency-dividing by means of the reference pulse generating counter 223 the output clock pulses *h* from the clock pulse generator 210. The clock pulse frequency is K times (K is an integer) the frequency $f_T$[Hz] of the TACH pulses *c* under the steady condition, and the latter frequency is determined to a frequency which is four times the reference vertical synchronizing pulse frequency $f_V$[Hz].

Figure 35:
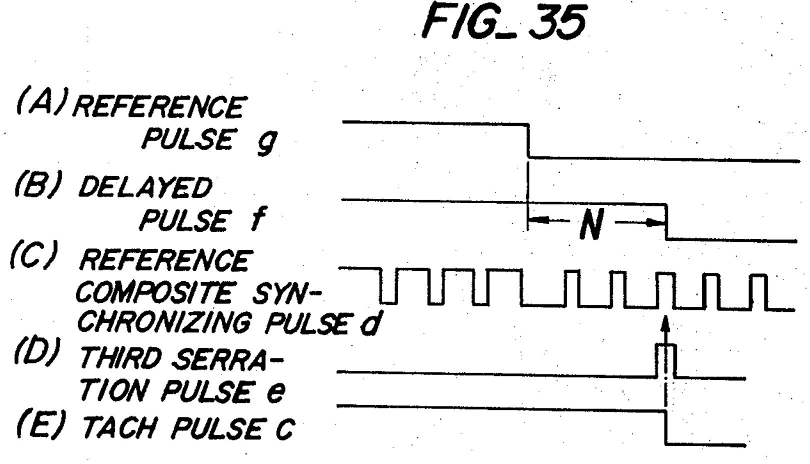

As shown in FIG. 35, under a defined phase relation of the TACH pulses *c* at steady state, a negative going edge of the TACH pulse *c* shown in FIG. 35(e) corresponds to a third serration pulse *e* shown in FIG. 35(D) which is separated from the reference composite synchronizing pulses *d* shown in FIG. 35(C) by means of the third serration pulse separating circuit 219. Therefore, the phase of the input reference pulse g shown in FIG. 35(A) to the counter 217 of the phase comparator may be advanced by N clock pulses from the third serration pulse *e*. In other words, it is sufficient to coincide the phase of a pulse which is obtained by delaying the input reference phase pulse *g* by N clock pulse periods with that of the third serration pulse *e*. To this end, the pulses *g* are frequency-divided by a fourth by means of the frequency divider 222 and are delayed by N clock pulse periods in the phase shifter 221 to obtain delayed pulses *f* shown in FIG. 35(B). The phase of the delayed pulses *f* from the phase shifter 221 is compared with the phase of the third serration pulses *e* in the control signal generator 220. When the delayed pulse *f* leads the pulse *e*, the control signal generator 220 produces a control signal having a pulse width which corresponds to said phase difference and this control signal is supplied to the reference phase pulse generating counter 223. The counter 223 delays its counting operation for a period corresponding to the pulse width of said control signal, so that the phase of an output pulse *g* is delayed. When the pulse *f* laggs with respect to the pulse *e*, the control signal generator 220 produces a control signal having a pulse width corresponding to the lag phase difference and supplies the control signal to the reference pulse generating counter 223. Then the counter 223 promotes its counting operation of the clock pulses by a period corresponding to the width of the control signal so as to lead the phase of an output pulse *g*. In the manner described above the output pulses from the frequency divider 222 lead by N clock pulse periods with respect to the third serration pulses e and the pulses g having the same phase as that of the output pulses from the frequency divider 222 also lead by N clock pulse periods with respect to the third serration pulses *e*. Thus by phase controlling the TACH pulses c with the pulses g being used as the reference phase pulses for the counter 217 of the phase comparator, the steady phase relation of the TACH pulses coincides with the third serration pulses e as shown in FIG. 35(E), so that the given phase relation may be obtained.

In the above embodiment, the third serration pulse e is used as a reference time position and the phase difference of the TACH pulses *c* with respect to said third serration pulses *e* is detected. But the present invention is not limited to such an embodiment and any pulse having a given phase may be separated from the reference composite synchronizing pulses *d*.

The digital control system according to the invention is not limited to the embodiments explained above and many modifications may be possible. For example, in a simple system such as a capstan servo system of VTR, a frequency discriminator and a phase modulator may be omitted and the servo system may be consisted of a phase comparator and a frequency modulator.

In the digital control system of VTR, a rotation phase of a video head drum in a play-back mode of VTR may be synchronized with external reference pulses. In this case reproduced synchronizing pulses, instead of TACH pulses, may be used as pulses to be controlled and local synchronizing pulses may be used as reference pulses.

In case of using the digital control system according to the invention as a capstan servo system of VTR, control truck reproduced pulses, insteas of TACH pulses may be utilized as pulses to be controlled. An automatic frequency control (AFC) circuit may be constructed by a combination of a frequency discriminator and a frequency modulator. Moreover, an automatic phase control (APC) circuit may be formed by a combination of a phase comparator and a frequency modulator.

Advantageous effects obtained by the digital control system according to the invention may be summarized as follows;

1. A stable oscillator such as a crystal oscillator can be used as a clock pulse source, so that the frequency deviation due to temperature variation can be avoided.

2. Since the sampling-hold is effected by a register in the form of binary number, the sampling-hold can be done completely irrespect of a sampling period and moreover influence of the supply source noise and mutual interference of the circuits can be extremely made small.

3. The control is carried out by means of digital circuits and as the results there is not existed any operation point drift and gain variation and the system is hardly affected by environments.

4. Gain variations of various parts can be also made small.

5. Since unit elements such as coils, resistors, capacitors and transistors are not almost necessary, integrated circuits may be easily utilized and the number of elements to be used is considerably reduced and reliability of the elements can be greatly enhanced. Moreover, various circuits, for example, a phase modulator may be formed in LSI circuits, so that the device may be made small in its size and light in its weight.

6. Since use is made of digital circuits, the control system of high reliability can be obtained.

7. Constructional elements having variable characteristics such as resistors, capacitors, d.c. amplifiers and variable frequency oscillators are not used, so that adjustments can be effected in a very simple manner. Moreover, since mutual interference between various circuits is little, the manufacture becomes easy and versatility of circuit elements is large and readjustment is still simple. Further the number of elements (integrated circuits) and kinds thereof can be made small and thus the cost of whole control system can be decreased.

8. The clock pulse frequency can be determined to a common multiple of various external reference synchronizing pulse frequencies and a motor driving pulse frequency and can be phase locked with the external reference synchronizing pulses, so that the stable operation can be effected and quantum noise can be avoided.

As described above, the digital control system according to the invention provides a more stable operation than known analogue control system and also has an improved reliability so that labour work for maintenance, readjustment and repair of the control device in the routine work is extremely decreased. This not only gives many advantages for users, but also offers simplicity in manufacturing and adjusting process for makers.

In the above embodiments the digital control system according to the invention for VTR has been explained in detail, but the invention is not restricted to such a use and may be used for various applications such as numerical control system and general digital type control systems. Moreover, a phase comparator, a frequency discriminator a phase modulator and a frequency modulator may be also utilized in the field of communication. Moreover components are very suitable to be formed in the form of not only IC, but also MSI and LSI. The invention provides a digital control system having a possibility to be used for wide applications in various fields.

What is claimed is:

1. A digital control system comprises means for forming pulses to be controlled in relation to a system to be controlled;

means for forming reference pulses;

means for producing clock pulses;

phase comparison means for counting the number of clock pulses which are interposed in an interval between said pulse to be controlled and said reference pulse by means of a binary counter to detect a phase difference between said pulse to be controlled and said reference pulse as a binary number and for storing said binary number representing said phase difference; and frequency modulating means for transferring said binary number stored in said phase comparison means to a binary counter which effects frequency division upon said clock pulses to produce frequency modulated carrier pulses, whereby an integral control is effected for said system to be controlled.

2. A digital control system as claimed in claim 1 further comprises frequency discrimination means for counting the number of clock pulses corresponding to a deviation of a period of said pulse to be controlled with respect to a period of said reference pulse by means of a binary counter to detect a frequency deviation of said pulse to be controlled as a binary number and for storing said binary number representing said frequency deviation; and phase modulating means for transferring said stored binary number representing said frequency deviation to a delay counter to phase-modulate said carrier pulses which have been frequency-modulated by said frequency modulating means, whereby an integral control and a differential control are effected for said system to be controlled.

3. A digital control system as claimed in claim 2 further comprises means for transferring said binary number representing the phase difference and stored in said phase comparison means to said delay counter of said phase modulating means to phase-modulate said carrier pulses which have been frequency-modulated by said frequency modulating means, whereby an integral control, a differential control and a proportional control are effected for the system to be controlled.

4. A digital control system as claimed in claim 1, wherein said phase comparison means comprises a binary counter of n stages for counting the number of clock pulses corresponding to said phase difference, said n stage binary counter is so constructed that its output count value is $2^{n-2}$ in case of zero phase difference; its output count is held to $2^{n-1}$, when the number of clock pulses corresponding to said phase difference exceeds $2^{n-1}$, but said phase difference does not exceed about a half period of said reference pulse; and its output count is held to zero, when said phase difference exceeds about a half period of said reference pulse, but does not exceed a period of said reference pulse; whereby a time necessary for effecting the phase comparison is shortened.

5. A digital control system as claimed in claim 1, wherein said binary counter in said phase comparison means is so constructed as to be reset by said reference pulses and wave forms of said reference pulses are so modified that a time period during which said counter is reset is made longer, whereby a leading or lagging phase difference of said pulse to be controlled with respect to said reference pulse can be detected symmetrically.

6. A digital control system as claimed in claim 1, wherein said frequency modulating means comprises a binary counter of m stages which frequency-divides the clock pulses having a frequency $f_C$ to produce carrier pulses having a frequency $f_F$, said carrier pulses being frequency-modulated by the binary coded modulating signal transferred from said phase comparison means, said binary coded modulating signal having a maximum value of $2^n - 1$, and $2^{m-1} \leq f_C/f_F \leq 2^m - 2^{n-1}$;

means for producing an output pulse constructing said carrier pulses each time a count value of said binary counter reaches $2^m - 1$ and for setting a counter output to $2^m - (f_C/f_F + 2^{n-1})$ by means of a next following clock pulse; and means for adding a value of said modulating signal to a count value of said binary counter, when all of lower n bits of the count value of said binary counter are 1 and at least one of bits higher than an nth bit is 0.

7. A digital control system as claimed in claim 1 further comprises gain adjusting means between said phase comparison means and said frequency modulating means, said gain adjusting means comprising means for subtracting a given bias value from said binary number stored in said phase comparison means;

means for multiplying an output from said subtracting means by $I/2^i$ (I and $i$ are arbitrary positive integers); and means for adding said bias value to an output of said multiplying means to produce an output binary coded modulating signal, whereby a deviation of said output binary coded modulating signal with respect to said bias value is equal to a deviation of said input binary coded modulating signal multiplied by $I/2^i$ with respect to said bias value.

8. A digital control system as claimed in claim 1 further comprises gain adjusting means between said phase comparison means and said frequency modulating means, said gain adjusting means comprising a sampling circuit for exchanging a modulating signal supplied to said frequency modulating means between said binary coded modulating signal from said phase comparison means and a binary number for which said frequency modulating means produces carrier pulses having a center frequency; and a frequency divider for producing sampling pulses to said sampling circuit, whereby a gain adjustment is effected by changing a frequency division ratio of said frequency divider.

9. A digital control system as claimed in claim 2, wherein said phase comparison means comprises a binary counter of n stages for counting the number of clock pulses corresponding to said phase difference, said n stage binary counter is so constructed that its count value is $2^{n-2}$ in case of zero phase difference; its output count is held to $2^{n-1}$, when the number of clock pulses corresponding to said phase difference exceeds $2^{n-1}$, but said phase difference does not exceed about a half period of said reference pulse; and its output count is held to zero, when said phase difference exceeds about a half period of said reference pulse, but does not exceed a period of said reference pulse; whereby a time necessary for effecting the phase comparison is shortened.

10. A digital control system as claim in claim 2, wherein said binary counter in said phase comparison means is so constructed as to be reset by said reference pulses and wave forms of said reference pulses are so modified that a time period during which said counter is reset is made longer, whereby a leading or lagging phase difference of said pulse to be controlled with respect to said reference pulse can be detected symmetrically.

11. A digital control system as claimed in claim 2, wherein said frequency modulating means comprises a binary counter of m stages which frequency-divides the clock pulses having a frequency $f_C$ to produce carrier pulses having a frequency $f_F$, said carrier pulses being frequency-modulated by the binary coded modulating signal transferred from said phase comparison means, said binary coded modulating signal having a maximum value of $2^n - 1$, and $2^{m-1} \leq f_C/f_F \leq 2^m - 2^{n-1}$;

means for producing an output pulse constructing said carrier pulses each time a count value of said binary counter reaches $2^m - 1$ and for setting a counter output to $2^m - (f_C/f_F + 2^{n-1})$ by means of a next following clock pulse; and means for adding a value of said modulating signal to a count value of said binary counter, when all of lower n bits of the count value of said binary counter are 1 and at least one of bits higher than an nth bit is 0.

12. A digital control system as claimed in claim 2, wherein said frequency discrimination means comprises a binary counter of m stages for counting the number of clock pulses corresponding to said frequency deviation of said pulse to be controlled with respect to said reference pulse, said binary counter being so constructed that its output count is $2^{m-1}$ in case of zero deviation so as to be able to detect the maximum frequency deviation of $2^m - 1$, at each count starting instance a fraction of clock pulses being set to said binary counter, said fraction being obtained by subtracting from the number of clock pulses corresponding to a period of said referance pulse $2^{m-1}$ clock pulses and integer multiple of $2^m$ clock pulses.

13. A digital control system as claimed in claim 2, wherein said frequency discrimination means comprises a high frequency response circuit having a digital type calculation circuit for deriving a difference between a value of said binary number representing said phase difference at any instance $t_i$ and that at an instance $t_{i+1}$ which is delayed from said instance $t_i$ by a time period $T_S$ to produce a binary number representing said frequency deviation, whereby amplitude and phase characteristics of said digital type calculation circuit can be varied by changing said time period $T_S$ to change the frequency discrimination characteristic of said frequency discimination means.

14. A digital control system as claimed in claim 2, wherein said phase modulating means comprises a delay device having an m stage binary counter with respect to the binary coded modulating signal of n bits ($n \leqq m$); and means for starting clock pulse-counting of said binary counter from zero count by means of a pulse to be modulated, for adding a value of said modulating signal to a count value just after said starting or during a counting operation or setting said counter to a value of said modulating signal by means of said pulse to be modulated, and for producing a modulated pulse at an instance at which the count value reaches an arbitrary count value of $N(2^n \leqq N)$ and at the same time for stopping the counting operation of said counter, whereby a delay amount of said pulses to be modulated is varied in accordance with a value of said modulating signal.

15. A digital control system as claimed in claim 2, wherein said phase modulating means for phase modulating pulses to be modulated by said binary coded modulating signal is so constructed that writing and transferring of said modulating signal are effected by means of set input terminals and reset input terminals of flip-flops constituting said delay counter so as to separate counting means and transferring means from each other, whereby said delay counter is independent to construct a synchronized counter.

16. A digital control system as claimed in claim 2 further comprises gain adjusting means between said phase comparison means and said frequency modulating means and between said frequency discrimination means and said phase modulating means, each of said gain adjusting means comprising means for subtracting a given bias value from said binary number stored in said phase comparison means;

means for multiplying an output from said subtracting means by $I/2^i$ (I and $i$ are arbitrary positive integers); and means for adding said bias value to an output of said multiplying means to produce an output binary coded phase modulating signal, whereby a deviation of said output binary coded phase modulating signal with respect to said bias value is made equal to a deviation of said input binary coded phase modulating signal multiplied by $I/2^i$ with respect to said bias value.

17. A digital control system as claimed in claim 2 further comprises first gain adjusting means between said frequency discrimination means and said phase modulating means, said first gain adjusting means comprising means for subtracting a given bias value from said binary number stored in said frequency discrimination means, means for multiplying an output from said substracting means by $I/2^i$ (I and i are arbitrary positive integers), and means for adding said bias value to an output of said multiplying means to produce an output binary coded phase modulating signal, whereby a deviation of said output binary coded phase modulating signal with respect to said bias value is made equal to a deviation of said input binary coded phase modulating signal multiplied by $I/2^i$ with respect to said bias value; and second gain adjusting means between said phase comparison means and said frequency modulating means, said second gain adjusting means comprising, a sampling circuit for exchanging a modulating signal supplied to said frequency modulating means between said binary coded modulating signal from said phase comparison means and a binary number for which said frequency modulating means produces carrier pulses having a center frequency, and a frequency divider for producing sampling pulses supplied to said sampling circuit, whereby a gain adjustment is effected by changing a frequency division ratio of said frequency divider.

18. A digital control system as claimed in claim 3, wherein said phase comparison means comprises a binary counter of n stages for counting the number of clock pulses corresponding to said phase difference, said n stage binary counter is so constructed that its output count is $2^{n-2}$ in case of zero phase difference; its output count is held to $2^{n-1}$, when the number of clock pulses corresponding to said phase difference exceeds $2^{n-1}$, but said phase difference does not exceed about a half period of said reference pulse; and its output count is held to zero, when said phase difference exceeds about a half period of said reference pulse, but does not exceed a period of said reference pulse; whereby a time necessary for effecting the phase comparison is shortened.

19. A digital control system as claimed in claim 3, wherein said binary counter in said phase comparison means is so constructed as to be reset by said reference pulses and wave forms of said reference pulses are so modified that a time period during which said counter is reset is made longer, whereby a leading or lagging phase difference of said pulse to be controlled with respect to said reference pulse can be detected symmetrically.

20. A digital control system as claimed in claim 3, wherein said frequency modulating means comprises a binary counter of m stages which frequency-divides the clock pulses having a frequency $f_C$ to produce carrier pulses having a frequency $f_F$, said carrier pulses being frequency-modulated by the binary coded modulating signal transferred from said phase comparison means, said binary coded modulating signal having a maximum value of $2^n - 1$, and $2^{m-1} \leqq f_C/f_F \leqq 2^m - 2^{n-1}$;

means for producing an output pulse constructing said carrier pulses each time a count value of said binary counter reaches $2^m - 1$ and for setting a counter output to $2^m - (f_C/f_F + 2^{n-1})$ by means of a next following clock pulse; and means for adding a value of said modulating signal to a count value of said binary counter, when all of lower n bits of an output count of said binary counter are 1 and at least one of bits higher than an nth bit is 0.

21. A digital control system as claimed in claim 3, wherein said frequency discrimination means comprises a binary counter of m stages for counting the number of clock pulses corresponding to said frequency deviation of said pulse to be controlled with respect to said reference pulse, said binary counter being so constructed that its output count is $2^{m-1}$ in case of zero deviation so as to be able to detect the maximum frequency deviation of $2^m - 1$, at each count starting instance a fraction of clock pulses being set to said binary counter, said fraction being obtained by subtracting from the number of clock pulses corresponding to a period of said reference pulse $2^{m-1}$ clock pulses and integer multiple of $2^m$ clock pulses.

22. A digital control system as claimed in claim 3, wherein said frequency discrimination means comprises a high frequency response circuit having a digital type calculation circuit for deriving a difference between a value of said binary number representing said phase difference at any instance $t_i$ and that at an instance $t_{i+1}$ which is delayed from said instance $t_i$ by a time period $T_S$ to produce a binary number representing said frequency deviation, whereby amplitude and phase characteristics of said digital type calculation circuit can be varied by changing said time period $T_S$ to change the frequency discrimination characteristic of said frequency discrimination means.

23. A digital control system as claimed in claim 3, wherein said phase modulating means comprises a delay device having an m stage binary counter with respect to the binary coded modulating signal of n bits ($n \leq m$); and means for starting clock pulse-counting of said binary counter from zero count by means of a pulse to be modulated, for adding a value of said modulating signal to a count value just after said starting or during a counting operation or setting said counter to a value of said modulating signal by means of said pulse to be modulated, and for producing a modulated pulse at an instance at which the count value reaches an arbitrary count value of N($2^n \leq$ N) and at the same time for stopping the counting operation of said counter, whereby a delay amount of said pulses to be modulated is varied in accordance with a value of said modulating signal.

24. A digital control system as claimed in claim 3, wherein said phase modulating means for phase modulating pulses to be modulated by said binary coded modulating signal is so constructed that writing and transferring of said modulating signal are effected by means of set input terminals and reset input terminals of flip-flops constituting said delay counter so as to separate counting means and transferring means from each other, whereby said delay counter is independent to construct a synchronized counter.

25. A digital control system as claimed in claim 3 further comprises gain adjusting means between said phase comparison means and said frequency modulating means, between said frequency discrimination means and said phase modulating means and between said phase comparison means and said phase modulating means, each of said gain adjusting means comprising means for subtracting a given bias value from said binary number stored in said frequency discrimination means;

means for multiplying an output from said subtracting means by $I/2^i$ (I and i are arbitrary positive integers); and means for adding said bias value to an output of said multiplying means to produce an output binary coded modulating signal to said phase modulating means, whereby a deviation of said output binary coded modulating signal with respect to said bias value is made equal to a deviation of said input binary coded modulating signal multiplied by $I/2^i$ with respect to said bias value.

26. A digital control system as claimed in claim 3 further comprises first gain adjusting means between said phase comparison means and said phase modulating means, second gain adjusting means between said frequency discrimination means and said phase modulating means and third gain adjusting means between said phase comparison means and said frequency modulating means, each of said first and second gain adjusting means comprising means for subtracting a given bias value from said binary number stored in said phase comparison means, means for multiplying an output from said substracting means by $I/2^i$ (I and i are arbitrary positive integers), and means for adding said bias value to an output of said multiplying means to produce an output binary coded modulating signal, whereby a deviation of said output binary coded modulating signal with respect to said bias value is equal to a deviation of said input binary coded modulating signal multiplied by $I/2^i$ with respect to said bias value, and said third gain adjusting means comprising a sampling circuit for exchanging a modulating signal supplied to said frequency modulating means between said binary coded modulating signal from said phase comparison means and a binary number for which said frequency modulating means produces carrier pulses having a center frequency, and a frequency divider for producing sampling pulses to said sampling circuit, whereby a gain adjustment is effected by changing a frequency division ratio of said frequency divider.

27. A digital control system comprises means for forming pulses to be controlled in relation to a system to be controlled;

means for forming reference pulses;

means for producing clock pulses;

frequency discrimination means for counting the number of clock pulses corresponding to a deviation of a period of said pulse to be controlled with respect to a period of said reference pulse by means of a binary counter to detect said deviation as a binary number representing a frequency deviation of said pulse to be controlled with respect to said reference pulse and for storing said binary number; and phase modulating means for transferring said stored binary number to a delay counter to phase-modulate carrier pulses which are obtained by frequency-dividing said clock pulses, whereby a differential control is effected to said system to be controlled.

28. A digital control system comprises means for forming pulses to be controlled in relation to a system to be controlled;

means for forming reference pulses;

means for producing clock pulses;

phase comparison means for counting the number of clock pulses which are interposed in an interval between said pulse to be controlled and said reference pulse by means of a binary counter to detect a phase difference between said pulses to be controlled and said reference pulse as a binary number and for storing said binary number representing said phase difference; and phase modulating means for transferring said stored binary number to a delay counter to phase-modulate carrier pulses which are obtained by frequency-dividing said clock pulses, whereby a proportional control is effected for said system to be controlled.

29. A digital control system for controlling a rotation of a recording and reproducing head of a video information recording and reproducing apparatus comprises means for detecting a rotation of a motor driving said recording and reproducing head to produce output TACH pulses;

means for producing reference synchronizing pulses of a television signal;

means for producing clock pulses;

phase comparison means for counting the number of clock pulses which are interposed in an interval between said TACH pulse and said reference synchronizing pulse by means of a binary counter to detect a phase difference between said TACH pulse and said reference synchronizing pulse and for storing said binary number;

frequency modulating means for transferring said binary number stored in said phase comparison means to a binary counter which effects frequency division upon said clock pulses to produce carrier pulses, said carrier pulses being frequency-modulated by said binary number from said phase comparison means; and means for driving said motor by means of motor driving pulses having a center frequency which is obtained by frequency-dividing said carrier pulses, whereby a repetition frequency of said clock pulses is so determined to have integer relation with a reference vertical synchronizing pulse frequency, a reference horizontal synchronizing pulse frequency of said television signal and said center frequency of said motor driving pulses.

30. A digital control system comprises means for forming pulsps to be controlled in relation to a system to be controlled;

means for forming reference pulses;

means for producing clock pulses;

phase comparison means for counting the number of clock pulses which are interposed in an interval between said pulse to be controlled and said reference pulse by means of a binary counter to detect a phase difference between said pulse to be controlled and said reference pulse as a binary number and for storing said binary number representing said phase difference;

frequency modulating means for transferring said binary number stored in said phase comparison means to a binary counter which effects frequency-division upon said clock pulses to produce frequency-modulated carrier pulses, whereby an integral control is effected for said system to be controlled; and said means for forming reference pulses comprising an automatic phase adjusting device having a generator for producing a control signal and a reference pulse generating counter, a counting operation of which is controlled by said control signal and outputs of said counter being said reference pulses, wherein said control signal generator comprises means for deriving pulses having a given phase among reference composite synchronizing pulses, a frequency divider for frequency-dividing said reference pulses to produce pulses having the same frequency as that of said given phase pulses, a phase shifter for phase-shifting said pulses from said frequency divider by a time corresponding to the given number of clock pulses to produce delayed pulses and means for comparing the phase of said delayed pulses with that of said given phase pulses to produce said control signal, and said reference pulse generating counter frequency-divides said clock pulses by means of said control signal to produce said reference pulses having a frequency which is equal to that of said pulses to be controlled, whereby said system to be controlled is kept in a given phase relation with said reference composite synchronizing pulses.

* * * * *